US012587926B2

(12) United States Patent
Naseer-Ul-Islam et al.

(10) Patent No.: US 12,587,926 B2
(45) Date of Patent: Mar. 24, 2026

(54) HANDOVER CONTROL MECHANISM IN NON-HOMOGENEOUS NETWORK ARCHITECTURE

(71) Applicant: Nokia Technologies Oy, Espoo (FI)

(72) Inventors: Muhammad Naseer-Ul-Islam, Munich (DE); Ahmad Awada, Munich (DE); Omer Bulakci, Munich (DE); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 552 days.

(21) Appl. No.: 18/031,907

(22) PCT Filed: Oct. 16, 2020

(86) PCT No.: PCT/EP2020/079218
§ 371 (c)(1),
(2) Date: Apr. 14, 2023

(87) PCT Pub. No.: WO2022/078611
PCT Pub. Date: Apr. 21, 2022

(65) Prior Publication Data
US 2023/0397073 A1      Dec. 7, 2023

(51) Int. Cl.
*H04W 36/00* (2009.01)
*H04W 36/18* (2009.01)
*H04W 36/24* (2009.01)

(52) U.S. Cl.
CPC ....... *H04W 36/18* (2013.01); *H04W 36/0064* (2023.05); *H04W 36/0083* (2013.01); *H04W 36/13* (2023.05); *H04W 36/249* (2023.05)

(58) Field of Classification Search
CPC ............. H04W 36/18; H04W 36/0064; H04W 36/0083; H04W 36/13; H04W 36/249;
(Continued)

(56) References Cited

U.S. PATENT DOCUMENTS 10,278,100 B1 *   4/2019   Balmakhtar ...... H04W 36/0077
2014/0200005 A1   7/2014   Wegmann et al. ........... 455/436

FOREIGN PATENT DOCUMENTS

WO      WO 2019/157893 A1    8/2019
WO      WO 2020/025121 A1    2/2020
WO      WO 2020/030278 A1    2/2020

OTHER PUBLICATIONS

"3rd Generation Partnership Project; Technical Specification Group Radio Access Network; NG-RAN; NG Application Protocol (NGAP) (Release 16)", 3GPP TS 38.413, V16.2.0, Jul. 2020, pp. 1-462.
(Continued)

*Primary Examiner* — Marcos Batista
(74) *Attorney, Agent, or Firm* — Lippes Mathias LLP

(57)      ABSTRACT

An apparatus for use by a communication network control element or function configured to control a communication connection with a communication element or function in a first area and using a specific communication capability, the apparatus being configured to determine that a handover procedure is conducted for the communication element to switch the communication connection from the first area to a second area controlled by a target communication network control element or function to cause sending of a handover related request to the target communication network control element or function for starting a handover procedure, the handover related request including a request for service continuity including an indication that service continuity is required for at least one specific communication session, wherein the request for service continuity indicates that a path switch to the communication network is to be delayed.

20 Claims, 10 Drawing Sheets

(58) Field of Classification Search
CPC ..... H04W 36/0005; H04W 36/008375; H04W
36/305; H04W 92/20; H04W 36/0022
USPC ........................................ 370/331; 455/312
See application file for complete search history.

(56) References Cited

OTHER PUBLICATIONS

"3rd Generation Partnership Project; Technical Specification Group
Radio Access Network; NG-RAN; Xn application protocol (XnAP)
(Release 16)", 3GPP TS 38.423, V16.2.0, Jul. 2020, pp. 1-447.
"Msc-generator", Sourceforge, Retrieved on Nov. 28, 2024, Webpage
available at :https://sourceforge.net/projects/msc-generator/.
"3rd Generation Partnership Project; Technical Specification Group
Radio Access Network; NR; Radio Resource Control (RRC) pro-
tocol specification (Release 16)", 3GPP TS 38.331, V16.1.0, Jul.
2020, pp. 1-906.
Notice of Allowance received for corresponding European Patent
Application No. 20797055.9, dated Jul. 11, 2024, 8 pages.

* cited by examiner

HANDOVER CONTROL MECHANISM IN NON-HOMOGENEOUS NETWORK ARCHITECTURE

CROSS REFERENCE TO RELATED APPLICATION

This patent application is a U.S. National Stage application of International Patent Application Number PCT/EP2020/079218 filed Oct. 16, 2020, which is hereby incorporated by reference in its entirety.

BACKGROUND

Field

Examples of embodiments relate to apparatuses, methods, systems, computer programs, computer program products and (non-transitory) computer-readable media usable for controlling and conducting a handover procedure of a communication element or function, such as a user equipment, in a non-homogeneous network scenario in a communication network, such as a wireless communication network based on 3GPP standards, and in particular to apparatuses, methods, systems, computer programs, computer program products and (non-transitory) computer-readable media usable for controlling and conducting a handover procedure in which network slice continuity is provided.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3$^{rd}$ Generation Partnership Project
4G fourth generation
5G fifth generation
5GS 5G system
ACK acknowledgement
AMF access and mobility management function
AN access network
AP access point
BS base station
CBRA contention based random access
CFRA contention free random access
CHO conditional handover
CN core network
CP control plane
CPU central processing unit
DAPS dual active protocol stack
DL downlink
DRB data radio bearer
eMBB enhanced mobile Broadband
eNB evolved Node B
ETSI European Telecommunications Standards Institute
gNB next generation Node B
GPRS general packet radio service
HO handover
ID identification
LTE Long Term Evolution LTE-A LTE Advanced
MAC medium access control
MNO mobile network operator
NF network function
NG new generation
NSSF network slice selection function
NW network, network side
OAM operations, administrations and maintenance
PDCP packet data convergence protocol
PHY physical layer
PDU packet data unit
QoS quality of service
RACH random access channel
RAN radio access network
RAT radio access technology
RLF radio link failure
RRC radio resource control
SLA service level agreement
SDU service data unit
S-NSSAI single network slice selection assistance information
TA tracking area
UE user equipment
UL uplink
UMTS universal mobile telecommunication system
UP user plane
UPF user plane function
URLLC ultra reliable low latency communications

SUMMARY

According to an example of an embodiment, there is provided, for example, an apparatus for use by a communication network control element or function configured to control a communication connection with at least one communication element or function in a first area of a communication network and using a specific communication capability or communication function in the first area, the apparatus comprising at least one processing circuitry, and at least one memory for storing instructions to be executed by the processing circuitry, wherein the at least one memory and the instructions are configured to, with the at least one processing circuitry, cause the apparatus at least: to determine that a handover procedure is to be conducted for the at least one communication element or function so as to switch the communication connection from the first area to a second area of the communication network controlled by a target communication network control element or function, wherein the second area does not support specific communication capability or communication function used in the first area, to cause sending of a handover related request to the target communication network control element or function for starting a handover procedure, the handover related request including a request for service continuity comprising an indication that service continuity is required for at least one specific communication session using the specific communication capability or communication function in the first area, wherein the request for service continuity indicates to the target communication network control element or function that a path switch to the communication network for at least a user plane connection of the at least one specific communication session is to be delayed.

Furthermore, according to an example of an embodiment, there is provided, for example, a method for use in a communication network control element or function configured to control a communication connection with at least one communication element or function in a first area of a communication network and using a specific communication capability or communication function in the first area, the method comprising determining that a handover procedure is to be conducted for the at least one communication element or function so as to switch the communication connection from the first area to a second area of the communication network controlled by a target communication network control element or function, wherein the second area does not support specific communication capability or communication function used in the first area, causing sending of a handover related request to the target communication network control element or function for starting a handover procedure, the handover related request including a request for service continuity comprising an indication that service continuity is required for at least one specific communication session using the specific communication capability or communication function in the first area, wherein the request for service continuity indicates to the target communication network control element or function that a path switch to the communication network for at least a user plane connection of the at least one specific communication session is to be delayed.

According to further refinements, these examples may include one or more of the following features:

the request for service continuity may be related to a packet data unit session, a data radio bearer or a quality of service flow of the at least one communication session;

the request for service continuity may further comprise configuration information indicating a parameter configuration related to a service associated with the at least one specific communication session and the specific communication capability or communication function, wherein the configuration information may comprise at least one of selection assistance information for the specific communication capability or communication function, and lower layer parameter configuration information for the specific communication capability or communication function;

a timer value indicating a time period during which the path switch for at least the user plane connection of the at least one specific communication session is to be delayed may be provided to the target communication network control element or function, wherein the timer value may be provided by including an information element in the request for service continuity, or negotiating the timer value during the handover procedure.

the timer value may be one of a timer value preconfigured by the communication network, a timer value being configured on the basis of trajectory information of the communication element or function for which the handover procedure is to be conducted, or a timer value negotiated with the target communication network control element or function on the basis of a lower layer parameter configuration related to the specific communication capability or communication function to which the service continuity request is related;

the timer value may indicate a minimum time amount for which the target communication network control element or function has to support the service continuity;

a response to the handover related request may be received from the target communication network control element or function, the response may be processed for determining whether the target communication network control element or function supports the service continuity, and in case the service continuity is supported, a communication tunnel to the target communication network control element or function may be established for transmitting and receiving user plane data of the communication element or function;

when the handover of the communication element or function to the target communication network control element or function is completed, a transmission control processing may be conducted via the communication tunnel including receiving, from the target communication network control element or function, user plane data of the communication element or function and forwarding the received user plane data to a core network element or function of the communication network, and receiving, from a core network element or function of the communication network, user plane data of the communication element or function and forwarding the received user plane data to the target communication network control element or function;

the transmission control processing may be conducted until the timer expires, or an indication to end the transmission control processing is received from the target communication network control element or function;

the handover procedure may comprise one of a baseline handover procedure, a conditional handover procedure, and a dual active protocol stack handover procedure;

the processing may be conducted as part of a source communication network control element or function of the handover procedure to be conducted for the communication element or function.

According to another example of an embodiment, there is provided, for example, an apparatus for use by a communication network control element or function configured to control a communication connection with at least one communication element or function in a second area of a communication network, the communication network comprising at least the second area and a first area using a specific communication capability or communication function which is not supported in the second area, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from a source communication network control element or function of the first area, a handover related request for starting a handover procedure of the communication element or function, the handover related request including a request for service continuity comprising an indication that service continuity is required for at least one specific communication session using the specific communication capability or communication function of the first area, to determine whether the requested service continuity is supported, and in case the determination is affirmative to conduct a service continuity procedure in which a path switch to the communication network for at least a user plane connection of the at least one specific communication session is delayed.

Furthermore, according to another example of an embodiment, there is provided, for example, a method for use in a communication network control element or function configured to control a communication connection with at least one communication element or function in a second area of a communication network, the communication network comprising at least the second area and a first area using a specific communication capability or communication function which is not supported in the second area, the method comprising receiving, from a source communication network control element or function of the first area, a handover related request for starting a handover procedure of the communication element or function, the handover related request including a request for service continuity comprising an indication that service continuity is required for at least one specific communication session using the specific communication capability or communication function of the first area, determining whether the requested service continuity is supported, and in case the determination is affirmative conducting a service continuity procedure in which a path switch to the communication network for at least a user plane connection of the at least one specific communication session is delayed.

According to further refinements, these examples may include one or more of the following features:

the request for service continuity may be related to a packet data unit session, a data radio bearer or a quality of service flow of the at least one communication session;

the request for service continuity may further comprise configuration information indicating a parameter configuration related to a service associated with the at least one specific communication session and the specific communication capability or communication function, wherein the configuration information may comprise at least one of selection assistance information for the specific communication capability or communication function, and lower layer parameter configuration information for the specific communication capability or communication function;

a timer value indicating a time period during which the path switch for at least the user plane connection of the at least one specific communication session is to be delayed may be obtained, wherein the timer value may be obtained by a configuration information preset by the communication network, an information element included in the request for service continuity, or a negotiation with the source communication network control element or function during the handover procedure;

the timer value may be one of a timer value preconfigured by the communication network, a timer value being configured on the basis of trajectory information of the communication element or function for which the handover procedure is to be conducted, or a timer value negotiated with the source communication network control element or function on the basis of a lower layer parameter configuration related to the specific communication capability or communication function to which the service continuity request is related;

the timer value may indicate a minimum time amount for which the service continuity is to be supported;

a timer using the obtained timer value may be starter when a random access of the communication element or function is completed, or an acknowledgement of an execution of the handover is received from the communication element or function;

in case the service continuity is supported, a communication tunnel to the source communication network control element or function may be established for transmitting and receiving user plane data of the communication element or function;

when the handover of the communication element or function to the target communication network control element or function is completed, a communication control processing may be conducted via the communication tunnel including receiving, from the communication element or function, user plane data and forwarding the received user plane data to the source communication network control element or function, and receiving, from the source communication network control element or function, user plane data for the communication element or function and forwarding the received user plane data to the communication element or function;

the communication control processing may be conducted until the timer expires, or a handover procedure to another cell is executed;

a path switch to the communication network for a control plane connection of the at least one specific communication session may be conducted while the path switch to the communication network for at least the user plane connection of the at least one specific communication session is delayed;

it may be checked whether a further handover procedure for the communication element or function to an area using the specific communication capability or communication function is to be executed during the support of the service continuity, and if the further handover procedure is to be executed, the handover of the communication connection of the communication element or function to a further target communication network control element or function of the area using the specific communication capability or communication function may be initiated, or if the further handover procedure is not to be executed, the support of the service continuity may be continued or the support of the service continuity may be ended and the at least one specific communication session of the communication element or function using the specific communication capability or communication function may be terminated;

it may be determined that the area, to which the handover is to be executed, uses the specific communication capability or communication function on the basis of configuration information indicating parameter configuration received in the request for service continuity;

the handover procedure may comprise one of a baseline handover procedure, a conditional handover procedure, and a dual active protocol stack handover procedure;

the processing may be conducted as part of a target communication network control element or function of the handover procedure to be conducted for the communication element or function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which:

FIG. 1 shows a diagram illustrating an example of a communication network in which examples of embodiments are implementable;

DESCRIPTION OF EMBODIMENTS

Figure 2:
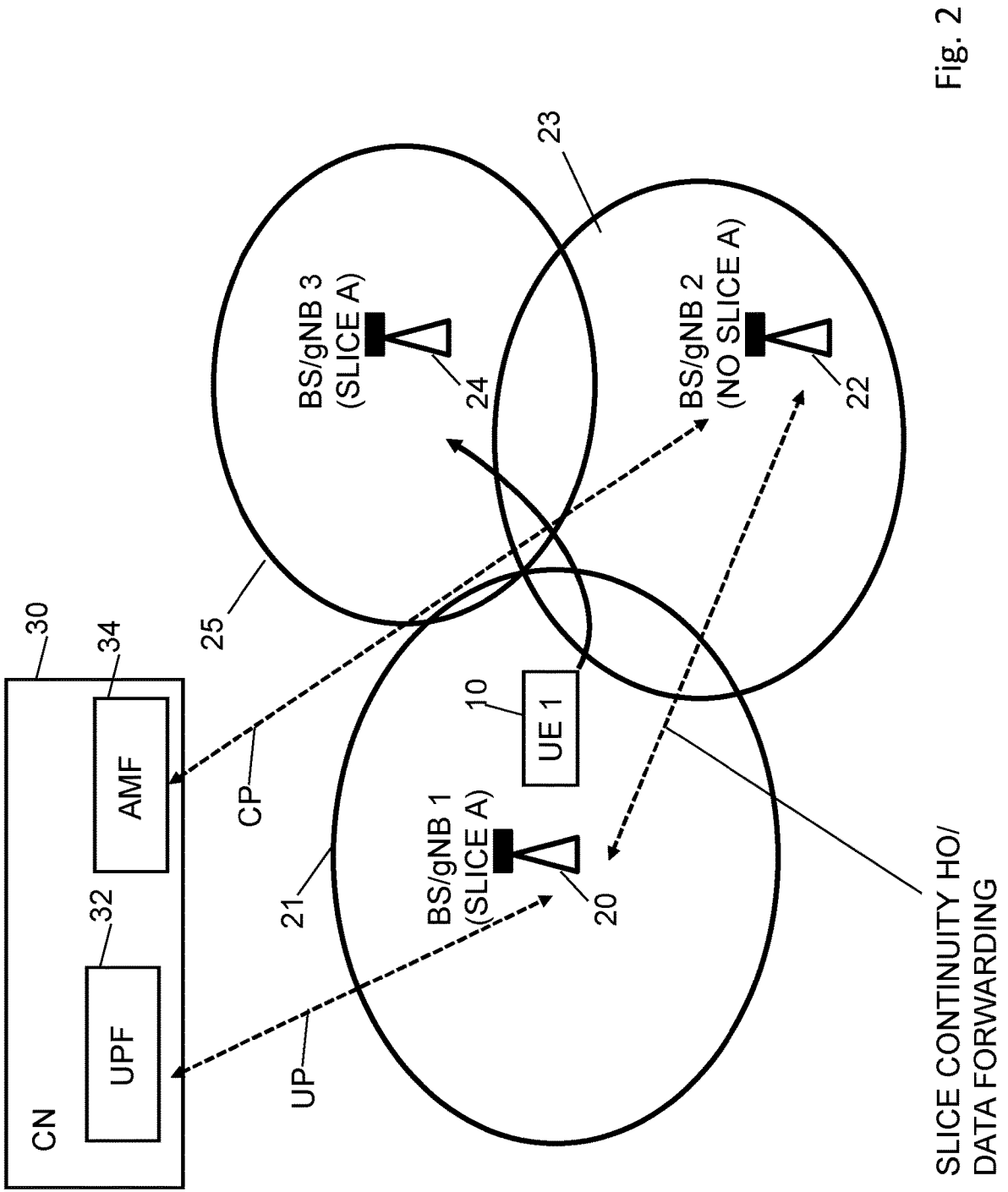
FIG. 2 shows a diagram illustrating an example of a scenario in a communication network in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more endpoints (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

In new communication networks, such as networks based on 5G or later releases, a new concept called network slicing is employed. Network slicing forms so-called slices (i.e. communication capabilities or communication functions) which allow a network operator to provide dedicated (virtual) networks with functionality specific to a service or customer over a common network infrastructure. This allows to support numerous and varied services envisaged e.g. in 5G and future systems, such as URLLC, eMBB etc.

Basically, network slicing allows multiple virtual networks to be created on top of a common shared physical infrastructure. The virtual networks are then customised to meet the specific needs of applications, services, devices, customers or operators.

However, it is possible that mobile communication systems (such as New Radio/5G or LTE) do not provide each slice or communication capability at each place or at each time. This results in a non-homogenous slice support, i.e. certain network slices are not supported in all network areas. For example, such network areas are respective cells which are controlled by a corresponding communication network control element or function, such as a gNB or eNB etc., wherein sizes and configurations of such network areas or cells are variable (e.g. macro cells, pico cells etc. are implementable).

Non-homogenous slice support may exist, for example, at a boundary of a restricted area where a slice or communication capability is supported, during an upgrade phase where cells are upgraded one by one with the new capability (e.g. slice support), when a network area or cell is entered which does not employ, for example, some dedicated features required for a service using the slice so that a resulting QoS is not completely in line with the slice's demands, or at connections between the CN and RAN of a cell which does not support the slice (i.e. backhaul restrictions).

For example, it is conceivable that a cell, irrespective of whether or not all features required for providing the slice in question are actually installed, is able to basically support the slice by its lower radio layers (e.g. by means of MAC scheduling). Nevertheless, it may happen that a cell cannot employ some dedicated features (e.g. for URLLC optimizations or the like), so that a QoS may not be completely in line with the slice's demands. Furthermore, required connections between the CN and RAN of the cell not supporting the slice, may be or may not be available.

Apart from the network operator related reasons, restrictions on the coverage of a network slice may also be required by the slice tenant i.e. the network operator customer that requests that slice to support a specialized service in a limited geographical area. These limitations are typically agreed as part of a Service Level Agreement (SLA) between network operator and slice tenant, and the network operator configures the individual network slices accordingly.

It is to be noted that slice-support information of the neighboring cells can be exchanged during setup or update procedures. For example, in a 3GPP based network, in which a specified interface between access nodes, such as eNGs and/or gNBs exists (which is referred to as Xn interface, for example), in Xn Set-Up and NG-RAN Node Configuration Update Procedures, such slice support information can be exchanged via this interface (e.g. Xn). For example, the slice support information is provided per tracking area (TA) and is in the form of a set of slice IDs, i.e., single network slice selection assistance information (S-NSSAI).

That is, unless a communication capability or slice is supported in the whole network, measures are required which allow to deal with such a non-homogenous scenario.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

In the following, it is assumed that there are network areas or cells supporting (or providing) a specific network or communication capability or function, such as a specific security scheme support, a slice support (referred to hereinafter also as "slice A"), and network areas or cells which do not support this specific network or communication capability or function. It is to be noted that in case reference is made to a "communication capability" or "slice" (e.g. "slice A") provided by a cell, basically equivalent services being available by this cell or network area are meant.

Furthermore, for the sake of simplicity, it is assumed that the cells are operated by the same MNO, wherein each cell offers at least a so-called MNO slice, as an example. Furthermore, according to examples of embodiments, it is assumed that cells are considered which are on the same frequency layer, wherein it is to be noted that examples of embodiments are also applicable to a case where cells are on different frequency layers.

Figure 1:
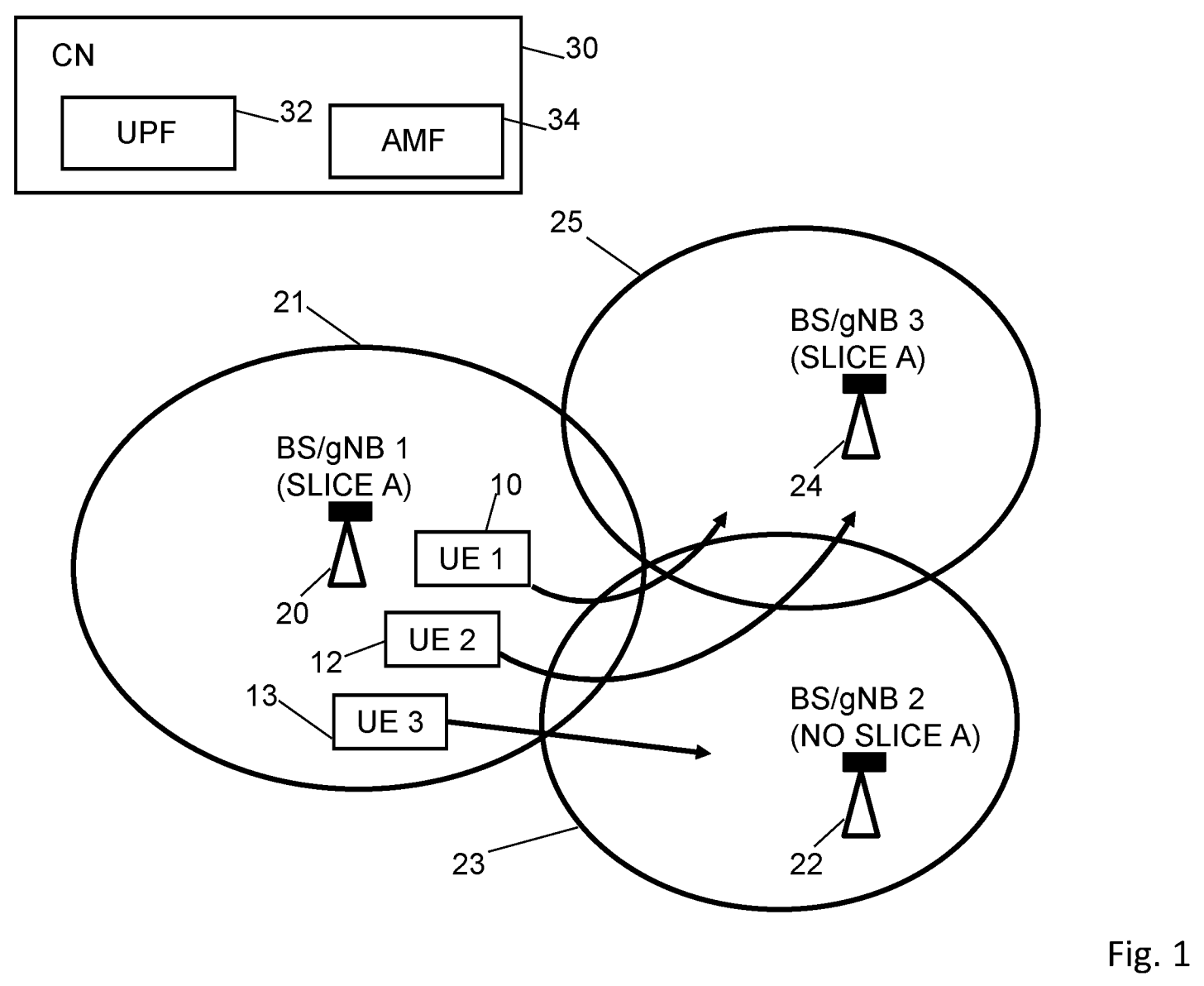

FIG. 1 shows a diagram for illustrating the non-homogenous scenario indicated above. Specifically, a simplified network part is shown in which three network areas or cells are shown. It is to be noted that the number of cells to be considered for a non-homogenous network deployment is variable. Furthermore, a simplified illustration of a core network (CN) of the communication network is indicated, wherein only those parts of the CN are depicted which are useful for the understanding of examples of embodiments. It is known to those skilled in the art that a CN comprises also other elements or functions besides those indicated in FIG. 1.

As shown in FIG. 1, it is assumed that a cell 21 controlled by a base station, e.g. a gNB 1 20 and cell 25 controlled by a base station, e.g. gNB 3 24, are cells providing a specific communication capability or slice, as described above (also referred to as slice A). On the other hand, a neighboring cell 23 controlled by a base station, e.g. gNB 2 22 is a cell which does not provide this specific communication capability or function (e.g. MEC support) (or slice, e.g. slice A), so that a non-homogenous network scenario is present. It is to be noted that the actual type of the base station controlling a cell may be different to that shown in FIG. 1.

Reference sign 30 denotes the core network CN of the communication network with which the gNBs 20, 22 and 24 are connected and which provides, for example, a link to other networks, such as the Internet. The CN 30 comprises, amongst others, a user plane function (UPF) 32 and an access and mobility function (AMF) 34.

A communication element or function, such as a UE 10, 12, 13, is connected to a RAN or access network (AN), e.g. the gNB 1 20, and to the AMF 34. The UE 10, 12, 13 is, for example, any device used directly by an end-user to communicate, such as a handheld phone, laptop etc., or any other mobile terminal that can connect to the network.

The RAN provides a radio technology that allows to access to the core network, and represents a base station (BS or NB) using a NR RAT and/or an evolved LTE base station, or a general base station including e.g. non-3GPP access, e.g., Wi-Fi or an access network termination such as a W-AGF for Wireline access, N3IWF for untrusted Non 3GPP access etc.

The core network architecture shown in FIG. 1 applied for a 5GS network comprises various network functions (NFs) besides the AMF and the UPF, as known to those skilled in the art. The AMF 34 is a function which oversees authentication, connection, mobility management between network and a device. It receives connection and session related information from the UE, provides UE-based authentication, authorization, mobility management, etc. The UPF 32 can be deployed in various configurations and locations, according to the service type. Functions of the UPF 32 are e.g. QoS handling for user plane, packet routing and forwarding, packet inspection and policy rule enforcement, traffic accounting and reporting.

For the sake of completeness, all cells 21, 23, and 25 support a default communication capability or slice of the network operator, i.e. the MNO slice. For example, it is assumed that services of the slice A cannot be fully mapped to the MNO slice, so that a UE using this slice A would experience at least some service degradation if its connection is mapped to the default MNO slice by the network.

In theory, when a UE is using a specific communication capability (e.g. a service of slice A) (also referred to as a sA-UE), this sA-UE should move predominantly in network areas where the slice A can be provided, i.e. in cells 21 and 25 which support slice A. However, it cannot be fully avoided that a sA-UE will leave the network area where the slice A is available, i.e. that it leaves the cells 21 and 25 and enters (only) cell 23. For illustrating possible scenarios in this case, in FIG. 1, three UEs are shown, i.e. UE 1 10, UE 2 12 and UE 3 13 following different ways in the network (indicated by corresponding arrows). It is to be noted that all three UEs shown in FIG. 1 are assumed to be sA-UEs, i.e. using services of a specific communication capability of function (e.g. slice A) in cell 21.

It is to be noted that in the following the term "connection switching" or "switch of a communication connection" refers to various types of changes in the connection of a communication element or function (e.g. a UE) in the network. For example, a baseline or conditional handover from a source cell to a target cell, an establishment or re-establishment of a communication connection to a cell (e.g. after losing contact to the network due to a RLF or the like), and a change of the connection type, e.g. from a single connectivity connection to a dual or multi connectivity connection involving a plurality of network areas or cells in the connection to the UE are related to a "connection switching" or the like in the following specification. Furthermore, it is to be noted that the term "connection switching" or "switch of a communication connection" is not related to the point of time where this switch (e.g. handover) is completed but to the time where such a switch is initiated or started, e.g. from the network in case of a handover or from the UE in case of a re-establishment procedure.

As shown in FIG. 1, UE 1 10 leaves the cell 21 only very shortly before entering cell 25. In this case, discontinuity of the slice A service might be avoided by postponing a connection switch (e.g. handover) to cell 25 and/or by preferring a handover to cell 25. This can be achieved with fine-adjusting corresponding handover thresholds within limits given by mobility robustness optimization (similar to mobility load balancing). Obviously, there is a risk of connection failures, such as a radio link failure (RLF).

UE 2 12 is assumed to completely leave network area supporting the slice A (i.e. cell 21), but it returns later to cell 25. Here, discontinuity of the slice A service cannot be avoided. That is, UE 2 12 cannot be kept in cell 21, but it is also not possible that cell 21 conducts a handover with cell 25 for UE 2 11 directly. For example, an interference from cell 23 would lead to a radio link failure or a handover failure. On the other hand, a handover to cell 23 leads to service discontinuity since the UE 2 12 can only use the MNO slice. Since the UE 2 12 can resume the service in cell 25 later on, it is preferred to allow the resumption as quickly as possible, and with as little overhead as possible.

UE 3 13, on the other hand, completely leaves the network area providing the slice A for a longer time. In this case, it may be preferred to terminate the slice A service.

However, neither the network nor the sA-UEs are able to know at the moment of leaving cell 21 which of the three paths it will go.

In conventional network configurations and network configurations being currently under development, such as for 5G NR according to 3GPP, when network slicing is employed, the UE provides slice information in terms of S-NSSAI upon requesting a service.

The UE has no explicit awareness when being in an RRC idle mode about the network support of a given slice, in 3GPP Release 15 and 16, for example. However, some limited slice-based access control is used. According to that, operator-defined access categories can be used to enable differentiated network access handling for different slices. For example, an NG-RAN may broadcast barring control information (i.e. a list of barring parameters associated with operator-defined access categories) to minimize the impact of congested slices. Furthermore, an exchange of information for slice support of neighbor cells (e.g. supported S-NSSAIs) as well as requested S-NSSAI in a HO request is done over interfaces between communication network control elements or functions, such as Xn/X2 between gNBs and/or eNBs. Moreover, as per 3GPP Release 15, for example, a target cell should reject a handover request when the corresponding S-NSSAI is not supported. Then, the UE would move to RRC idle mode as a consequence of the reject, in which state it requires some effort to identify a suitable cell with slice support because of the lack of the explicit awareness at the UE of which S-NSSAIs a cell support.

That is, according to current specification for a scenario of non-homogenous support of communication capabilities such as specific slices, first, the UE would go to RRC idle mode when entering cell 23 which does not support slice A, resulting in service interruption. It would be preferred to minimize such service interruptions, especially for the sA-UEs moving into cell 23 for short intervals.

Furthermore, access network control entities, such as gNBs, exchange, e.g. over an interface between them, such as an Xn interface, information about slice support of their cells (e.g. supported S-NSSAIs per TA) as well as S-NSSAI in a HO request. It is to be noted that HO request message comprises, for example, a UE ID reference, a cause indication, the target cell global ID, and UE context Information.

However, according to current standards, such as 3GPP TS 38.423, a target cell should reject PDU session resources, included in a HO request, that are associated to S-NSSAI which is not supported by the target cell. In this case, and if at least one PDU session resource is admitted, the target cell sends the HO request acknowledgment message including a list of PDU session resources being not admitted which lists corresponding PDU sessions rejected at the target cell.

Basically, it is conceivable, for example, to consider the following measures when e.g. radio conditions dictate a handover to a cell which does not support a required slice.

As a first option, the call can be released and the UE trying to switch to the new cell (e.g. cell 23) is set into the idle mode. This would be useful, for example, for the UE 3 13, but not optimal for UE 1 10 and UE 2 12. Furthermore, when moving to the RRC idle mode, the re-selection to a cell supporting slice A may be slower or impaired due to lack of awareness at the UE of which cells support which slice.

A second option is to execute a handover and continue with another slice provided by the cell 23 (e.g. the MNO slice which is supported by cell 23). This is useful for UE 2 12, but not optimal for UE 1 10 and UE 3 13. Furthermore, the configuration of the slice A service might get lost, since cell 23 does not support slice A and has no use for the configuration settings or is not able to understand it. Moreover, for cell 23, the UE appears to be satisfied with the provided slice, so that cell 23 (and hence the whole network) is not aware that the UE actually should use slice A when it enters another cell supporting again the slice A (e.g. cell 25). The mapping to another slice (e.g. the MNO slice) supported in the cell would already be done or proposed by cell 21 during the handover preparation.

A third option is to keep the UE in cell 21 until a handover to cell 25 is possible. This would be useful for the UE 1 10, but not optimal for UE 2 12 and UE 3 13. Furthermore, this option has a high risk of failure, i.e. an RLF may occur due to a too-late handover.

One approach in order to deal with non-homogeneous slice support can be using a Dual-Connectivity (DC) based service continuity mechanism. According to this approach, a Dual-connectivity/Multi-connectivity (DC/MC) based solution can be used to extend the network slice service to neighboring cells that do not support it. That is, when a source cell detects that a UE is moving towards a neighboring cell which does not support a network capability or function (i.e. a slice, for example), the source cell initiates a DC/MC connection with switched bearer via secondary cell group (SCG). The UE uses the air interface of the secondary gNB (SgNB), which is the slice non-supporting gNB) for all communications with the network and there is no radio connection with the master gNB (MgNB) once the UE moves into the coverage area of the SgNB. However, the corresponding core network connection still remains with the MgNB and the data is forwarded through SgNB in both UL and DL directions.

However, in this approach, it is to be considered that DC is only supported for inter-frequency scenarios. Therefore, in intra-frequency scenarios, to which the above described situation belongs, it is not applicable. It is to be noted that a majority of handovers take place between cells operating on the same frequency. Hence, also for intra-frequency scenarios the problem caused by non-homogeneous slice support is to be solved.

According to examples of embodiments, measures are provided which allow to ensure a service continuity in a non-homogenous network scenario, at least for a certain time, and to help guiding the UE to find a suitable cell with suitable communication capability or function (i.e. slice) support. In particular, according to examples of embodiments, measures are provided which allow to avoid unnecessary service interruptions by improving handover procedures conducted, for example, in connection with different kinds of handovers, such as baseline HO, DAPS HO and conditional HO (CHO).

Basically, according to examples of embodiments, when a target cell receives a network slice continuity HO request (instead of a regular HO request) from a source cell, this is understood as an indication for acting as a bridge between a UE using, for example, a specific slice (e.g. slice A) which is not supported by the target cell and original source cell for the communication in both UL and DL directions. In this case, the target cell de-couples the path switch of the control and user plane. This means that the target cell initiates a control plane path switch with the CN (i.e. the AMF) after the UE has successfully executed the handover. On the other hand, the target cell suspends or delays a path switch procedure for switching a user plane. This delay is based on information received from the source cell. For example, the information can be an indication to use a timer value (i.e. time duration) being pre-configured by the network (e.g. a fixed or variable default timer value, a timer value updated by the network, e.g. a CN element or function performing a configuration of the target cell), or a timer value that is set by or negotiated with the source cell, wherein the timer value indicates a time period for which the user plane path switch shall be delayed or a time period for which the support of the communication of the source cell is to be maintained.

FIG. 2 shows a diagram illustrating an example of a non-homogenous network scenario for explaining examples of embodiments. Specifically, FIG. 2 shows a network architecture which is in correspondence with FIG. 1, wherein only UE1 10 is depicted for illustrating the handover mechanism according to examples of embodiments allowing for slice service continuity in non-homogenous slice supporting deployments.

Basically, there are two phases to be considered. In the first phase, the UE moves from slice supporting cell 21 to a neighboring non-supporting cell 23. In this phase, the above described measures are employed by the controlling node of cell 23, i.e. gNB2 22, as the target communication network control element or function for supporting the service continuity, i.e. the delay of at least the UP path switch, for a predetermined period of time (indicated by the timer value).

The second phase is that the service continuity support ends or is at least modified. Specifically, the second phase depends on the situation during the timer is running or when the timer expires. For example, the second phase is when the UE moves back to a slice supporting cell (e.g. cell 25) from the first neighboring non-supporting cell. Then, according to some examples of embodiments, the handover to the new target cell is conducted which then conducts a usual path switch for UP and CP, while the service continuity support processing in cell 23 is terminated. Another case for the second phase is that, when the timer expires, the UE is still in the cell 23 (i.e. without a handover being conducted to a cell providing slice support). Then, according to some examples of embodiments, the service continuity support is terminated. In this case, the handover to the cell 23 is completed (i.e. UP path switch is made) which may result in service degradation, or the communication session using the non-supported capability (i.e. slice A) is ended. As another alternative, the service continuity support can also be elongated and continued for some further defined time period.

With regard to the first phase, i.e. when the UE moves to the slice non-supporting cell and a handover procedure (depending on the actual configuration, the HO may be any of a baseline HO, a conditional HO or a DAPS HO), the source cell (i.e. gNB1 20) initiates a handover related processing according to examples of embodiments, including slice-continuity HO request and negotiation procedure with the target cell (i.e. gNB2 22). In this procedure, an indication can be provided that service continuity support is required for a given communication session, e.g. a PDU session, even if the gNB2 does not support the required service or slice. Furthermore, according to some examples of embodiments, a parameter configuration is executed, which concerns e.g. lower layer parameter configuration (such as for MAC layer, PHY layer and the like) which is related to the service associated with the PDU session and the network slice.

It is to be noted that, according to some examples of embodiments, the granularity of the service continuity request is configurable. For example, the service continuity request may be related to a PDU session, it may be DRB specific, or it may be made per QoS flow (e.g. only for critical services/slices).

Furthermore, according to some examples of embodiments, in the service continuity request, a new communication capability specific (i.e. slice-specific) container is included, which is provided in connection with the HO request. The container includes information about the communication capability concerned (i.e. slice A) in the form of assistance information (e.g. at minimum the S-NSSAI of slice A) and optionally configuration parameters of lower layers (MAC, PHY, for example).

According to examples of embodiments, the communication capability specific information may be pre-configured or configured in gNBs, e.g., by a management entity, such as OAM or by a CN entity, such as AMF. In such cases, for example, a regular HO request may also trigger the gNBs to perform the described service continuity procedures, since the communication capability specific information is already configured.

It is to be noted that the target gNB2 22 can be configured to store the slice-specific container in order to be relayed transparently into subsequent handovers. This allows restoration of slice A at a next handover which is made, for example to a cell supporting the slice (e.g. to cell 25 controlled by gNB3 24).

The target gNB2 22 is configured, according to some examples of embodiments, to indicate to the source gNB1 20 whether it has accepted the service continuity request or not. This in indicated, for example, per PDU session, per DRB or per QoS flow, e.g. in accordance with the granularity of the service continuity request.

Moreover, according to example of embodiments, the source and target node (i.e. gNB1 20 and gNB2 22) establish an UL tunnel over a suitable interface, for example the Xn between gNBs, to forward data (such as UL PDCP SDUs) received by the target gNB2 22 to the source gNB1 20 to the UPF. It is to be noted that a similar DL tunnel for PDCP SDU forwarding is also established from the source to the target cell for data forwarding during HO procedure.

When the UE is configured to perform HO to gNB2 22 and executes a corresponding handover procedure (e.g. baseline HO, CHO etc.) to the gNB2 22, the target node, i.e. the gNB2 22 accepts the incoming UE. However, according to examples of embodiments, the target node (i.e. gNB2 22) does not perform a (complete) path switch procedure towards the CN immediately. That is, the path switch of the UE is suspended. As one alternative, the target node gNB2 22 performs a path switch to relocate the control plane (CP) connection but does not perform the user plane switch immediately. That is, as indicated in FIG. 2, a connection for user data (i.e. UP) such as N3 interface to the UPF 32 in the CN 30 remains with the gNB1 20, while on the other hand a connection for control data (i.e. CP) such as N2 interface to the AMF 34 is relocated to the gNB2 22.

As indicated above, a timer value Td can be configured, e.g. by the network, or, if provided by the source node, included in the HO request message. The timer value Td is used to indicate a time period in which the above described behavior of the gNB2 22 (i.e. the service continuity support) is allowed. The time value Td is set, for example, to such an amount of time that the service continuity support is allowed only for a certain time allowing the UE to return to a slice supporting cell, and not to extend the service continuity support beyond the cell of slice border (such as only for situations like for UE1 10 and UE2 12 in FIG. 1). A corresponding amount may be determined by simulation or experiments, or by observing the UE mobility patterns in actual network deployment, for example.

The timer using the timer value Td starts at the target gNB2 22 once the UE completes an attachment procedure to the target cell, such as when a RACH access/or (C)HO execution is completed (e.g. when the target gNB2 22 receives an ACK for RRC Reconfiguration Complete sent by the UE to the target cell).

According to some examples of embodiments, the timer Td can be a pre-configured value which is provided by the network, e.g. the by OAM. According to examples of embodiments, the timer Td can be e.g. a fixed value, or could be variable depending on which cell neighbors are involved in a service continuity support procedure.

Furthermore, according to some examples of embodiments, the timer Td is configured on the basis of UE trajectory information. For example, a variable timer value is generated for each UE which depends on a movement path or other trajectory related information being detected by the source node for this UE. For example, in a situation like that shown in FIG. 1, different values Td can be generated for UE1, UE2 and UE3. For obtaining required information to be used for determining such a timer value, information obtained through UE assistance information provided by the 5GC can be used, for example.

Moreover, according to some examples of embodiments, timer value Td can be negotiated between the source and target gNBs, e.g., based on the required RAN lower-layer (MAC, PHY etc.) parameter configurations related to the specific slice for which service continuity is required.

It is to be noted that the timer Td can also act as a minimum time period for which the target node has to support the requested PDU sessions.

In the second phase, as indicated above, the process depends on the current situation and setting of the target node. For example, the service continuity support is ended or modified, e.g. elongated.

Specifically, according to some examples of embodiments, when the UE 10 moves back to a slice supporting cell (e.g. cell 25) from the current non-supporting cell 23, before timer Td expires, a handover to the new target cell (i.e. gNB3 24) is conducted. The gNB3 24 conducts a usual path switch for UP and CP and provides the slice A related service, which is possible due to the information included in the communication capability specific (i.e. slice-specific) container which is forwarded with the HO request from the gNB2 22. On the other hand, the gNB2 22 can end the service continuity support processing.

On the other hand, when the timer Td expires before a HO to a slice supporting cell is possible, i.e. the UE 10 is still in the cell 23, according to some examples of embodiments, gNB2 22 can end the service continuity support. In this case, the gNB2 22 can continue the PDU session, e.g. when sufficient resources are available, and completed the original handover (i.e. UP path switch is made). As a result, service degradation may occur. Alternatively, the communication session using the non-supported capability (i.e. slice A) is ended.

As another alternative, the service continuity support can also be elongated and continued for some further defined time period. The duration of the elongation of the service continuity support can be set, for example, by the network, or calculated or determined on the basis of a current communication situation, such as a load at the cell 23.

It is to be noted that a handover procedure for switching the communication to the new slice supporting cell (e.g. cell 25) can be based on a common HO procedure for baseline HO, CHO or DAPS HO, with the exception that the UP connection is taken over from gNB1 20 instead of gNB2 22. Furthermore, it is also possible to adapt a HO procedure as described above for this purpose. In any case, for deciding as to whether a handover to a possible cell (in the example cell 25) is to be made, the gNB2 22 can use the information in the slice container. In other words, a decision for handover of the UE may be made only to a cell which supports slice A, for example.

Figure 3:
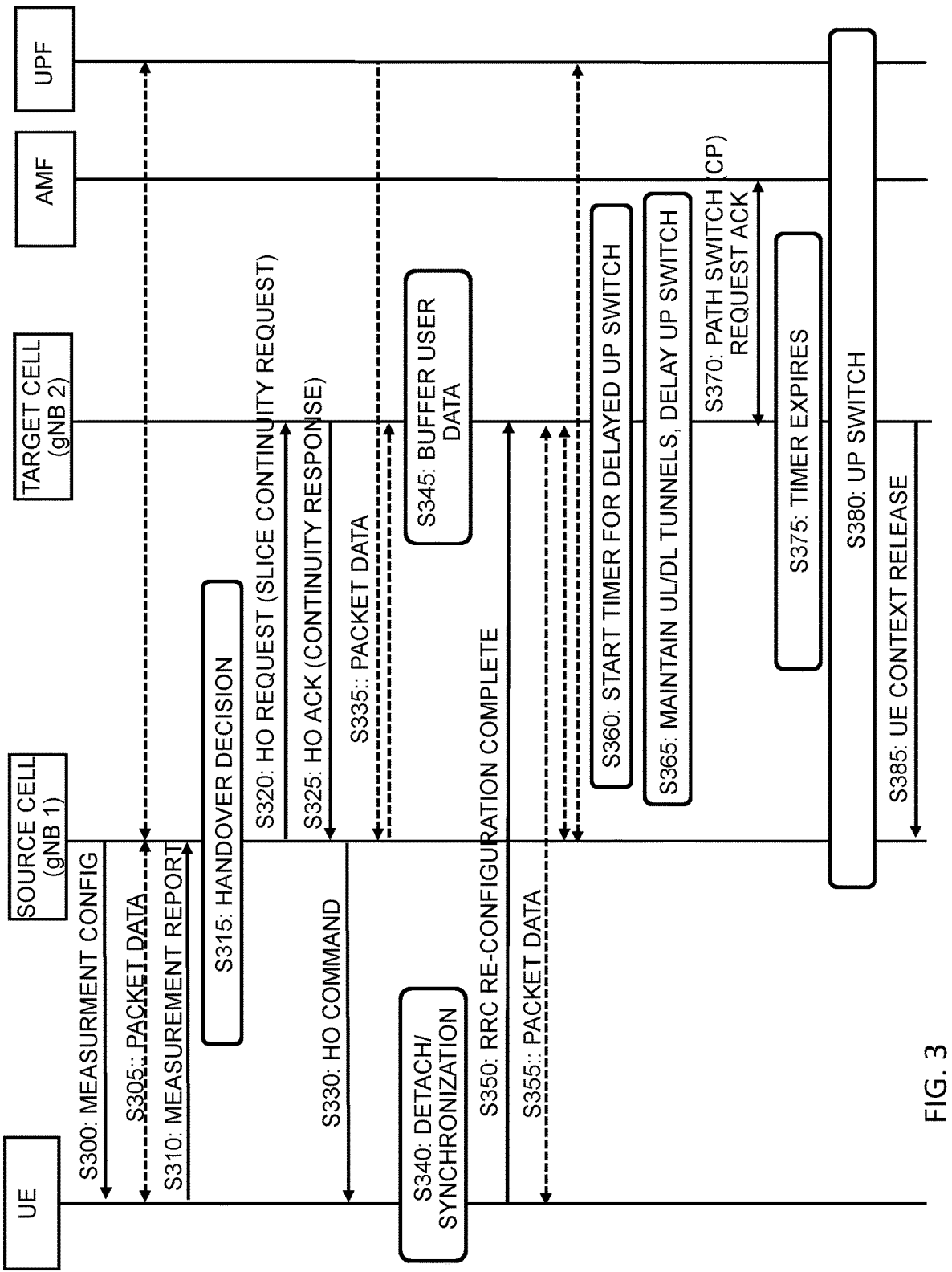
FIG. 3 shows a signaling diagram explaining a communication control according to example of an embodiment in a baseline handover case.

FIG. 3 shows a signaling diagram explaining a communication control according to examples of an embodiment in a baseline handover case. It is assumed that a situation like that shown in FIG. 2 is handled by the communication network wherein a baseline handover procedure is set for the UE which uses slice A in cell 21 which is not supported by cell 23, for example.

In S300, the source cell (i.e. gNB1 20) provides the UE with measurement configuration information related to measurements to be conducted for being able to decide about the necessity to conduct a handover, such as communication quality measurements and the like.

In S305, a normal packet data communication with the communication network is conducted for the UE 10 via gNB1 20 being the current serving node for UE 10.

In S310, a measurement report is provided by the UE 10 to the gNB1 20.

Based on the measurement report, in S315, the gNB1 20 makes a handover decision, wherein cell 23 with gNB2 22 as target node is determined.

In S320, a HO request message is sent to the target gNB2 22. According to the present example, as the UE 10 uses for at least one of the communication sessions established in the communication network slice A and the source gNB1 20 is aware that the cell to which the handover is to be made is not able to provide slice A service, the HO related message in S320 comprises also a request for service continuity. That is, in the message in S320, the gNB1 20 sends slice A specific RAN configuration information, such as a DRB profile, a potential neighbor list, an indication that the source node acts as an UL tunnel endpoint, the above described slice A container, and information indicating a delayed UP path switch, such as a timer value Td or a corresponding instruction to use a preset timer value for this purpose.

In S325, after having decided about the request for service continuity, the target gNB2 22 sends a response message to the source gNB1 20. The response message is included in a HO acknowledgement message and comprises an indication whether the gNB2 22 accepts or rejects the request for service continuity. For example, the decision regarding supporting the service continuity or not can be made on the basis of a current load situation or the like.

In accordance with a granularity of the request for service continuity, or independent thereof, the acceptance/rejection can be indicated per PDU, per QoS flow or per DRB. Furthermore, in indication is included that the gNB2 22 acts as a DL tunnel endpoint.

In S330, the source gNB1 20 issues a HO command to the UE.

In this context, the gNB1 20 forwards all UP data for the UE 10 to the target gNB2 22 in S335, which buffers the data in S345 for later provision to the UE (i.e. after the HO is completed).

At the same time, the UE 10 detaches from the source cell in S340 and conducts a synchronization procedure with the target cell (i.e. gNB2 22).

In S350, the UE 10 sends a RRC re-configuration complete message to the target gNB2 22 in order to indicate that the handover is performed.

Beginning from S355, while the UE 10 is attached to the gNB2 22, at least the UP connection to the communication network (i.e. the UPF 32) is still at the gNB1 20. Due to the service continuity support, the gNB2 22 forwards UP data received from the UE 10 to the gNB1 20, which forwards the data towards the network (e.g. via N3 interface, as described above). On the other hand, data being sent to the UE from the network is relayed from the gNB1 20 to the gNB2 22, which in turn forward the data to the UE 10.

As soon as the UE 10 is attached to the gNB2 22, the timer using the timer value Td is started in S360 which indicated the time period for which at least the UP path switch with the communication network (i.e. the AMF 34) is to be delayed.

During the time period indicated by the timer value Td, as indicated in S365, UL and DL tunnels are maintained between the gNB1 20 and the gNB2 22, while the UP path switch is delayed.

In S370, in the present example, a CP path switch is conducted (i.e. N2 interface between gNB2 22 and AMF 34), by exchanging a corresponding request-response signaling between the gNB2 22 and the AMF 34.

In case during the time period indicated by the timer value Td a HO to cell 25 is conducted, as described above, a complete connection switch to gNB3 24 may take place. However, in the present example, it is assumed that the timer expires in S380. Then, as also indicated above, as one of possible options, the target gNB2 22 conducts a complete path switch, i.e. is executed the UP path switch being delayed so far, in S380, and takes over the communication with the UE 10.

In S385, a UE context release message is sent from the gNB2 22 to the gNB1 20, which can then release the UE configuration.

Figure 4:
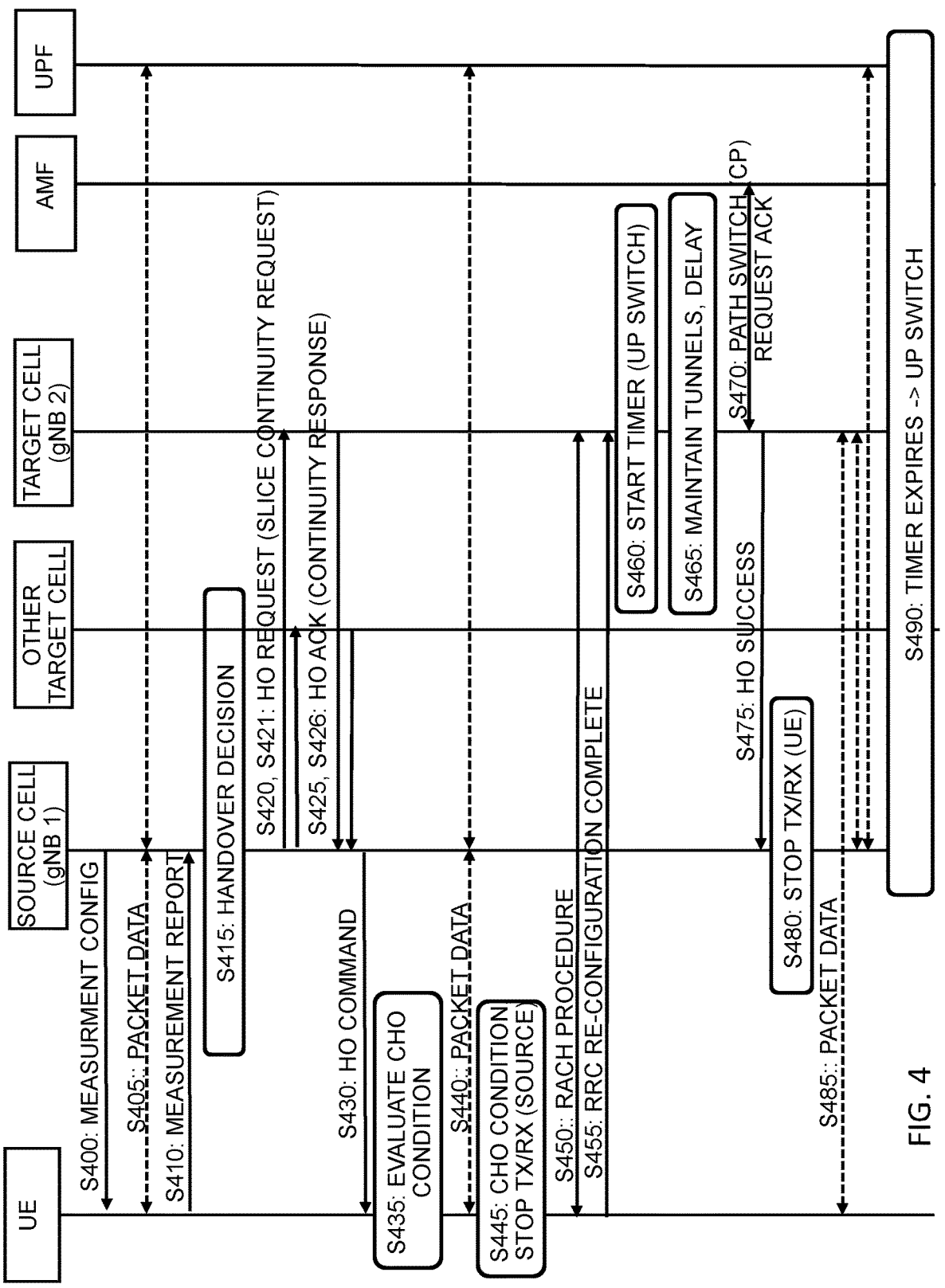
FIG. 4 shows a signaling diagram explaining a communication control according to example of an embodiment in a conditional handover case.

FIG. 4 shows a signaling diagram explaining a communication control according to examples of an embodiment in a conditional handover case. It is assumed that a situation like that shown in FIG. 2 is handled by the communication network wherein a CHO procedure is set for the UE which uses slice A in cell 21 which is not supported by cell 23, for example.

In S400, the source cell (i.e. gNB1 20) provides the UE with measurement configuration information related to measurements to be conducted for being able to decide about the necessity to conduct a handover, such as communication quality measurements and the like.

In S405, a normal packet data communication with the communication network is conducted for the UE 10 via gNB1 20 being the current serving node for UE 10.

In S410, a measurement report is provided by the UE 10 to the gNB1 20.

Based on the measurement report, in S415, the gNB1 20 makes a conditional handover decision, wherein candidate cells for the handover are determined, including cell 23 with gNB2 22 as one target node.

In S420 and S421, a HO request message is sent to the each candidate target cell, which includes also gNB2 22. According to the present example, as the UE 10 uses for at least one of the communication sessions established in the communication network slice A and the source gNB1 20 is aware that cells to which the handover is to be made are not able to provide slice A service, the HO related message in S420 comprises also a request for service continuity. That is, in the present example, in each of the messages in S420 and S421, the gNB1 20 sends slice A specific RAN configuration information, such as a DRB profile, a potential neighbor list, an indication that the source node acts as an UL tunnel endpoint, the above described slice A container, and information indicating a delayed UP path switch, such as a timer value Td or a corresponding instruction to use a preset timer value for this purpose.

In S425 and S426, after having decided about the request for service continuity, each of the target nodes, including gNB2 22, sends a response message to the source gNB1 20. The response message is included in a HO acknowledgement message and comprises an indication whether the gNB2 22 accepts or rejects the request for service continuity. For example, the decision regarding supporting the service continuity or not can be made on the basis of a current load situation or the like.

In accordance with a granularity of the request for service continuity, or independent thereof, the acceptance/rejection can be indicated per PDU, per QoS flow or per DRB. Furthermore, in indication is included that the target node (i.e. also gNB2 22) acts as a DL tunnel endpoint.

In S430, the source gNB1 20 issues a HO command to the UE.

Since the handover to be conducted in the present example is a CHO, in S435, the UE evaluates whether a condition for executing the CHO is met or not. As long as the condition is not met, a packet data communication like that in S405 is continued in S440.

In S445, the UE 10 determines that the condition for conducting the handover to cell 23 (i.e. gNB2 22) is met. Therefore, the UE stops transmission and reception processing with the source cell (i.e. gNB1 20) and starts a random access procedure in S450 with gNB2 22.

When the random access (which is already prepared by the HO request signaling in S420, for example) is completed, the UE 10 sends a RRC re-configuration complete message to the target gNB2 22 in S455 in order to indicate that the handover is performed.

As soon as the UE 10 is attached to the gNB2 22, the timer using the timer value Td is started in S460 which indicated the time period for which at least the UP path switch with the communication network (i.e. the AMF 34) is to be delayed.

During the time period indicated by the timer value Td, as indicated in S465, UL and DL tunnels are maintained between the gNB1 20 and the gNB2 22, while the UP path switch is delayed.

In S470, in the present example, a CP path switch is conducted (i.e. N2 interface between gNB2 22 and AMF 34), by exchanging a corresponding request-response signaling between the gNB2 22 and the AMF 34.

In S475, the target gNB2 22 informs the source gNB1 20 about the successful handover completion. In S480. The source gNB1 20 stops transmission and reception processing with the UE 10.

Then, in S485, while the UE 10 is attached to the gNB2 22, the UP connection to the communication network (i.e. the UPF 32) is still at the gNB1 20. Due to the service continuity support, the gNB2 22 forwards UP data received from the UE 10 to the gNB1 which forwards the data towards the network (e.g. via N3 interface, as described above). On the other hand, data being sent to the UE from the network is relayed from the gNB1 20 to the gNB2 22, which in turn forwards the data to the UE 10.

Figure 5:
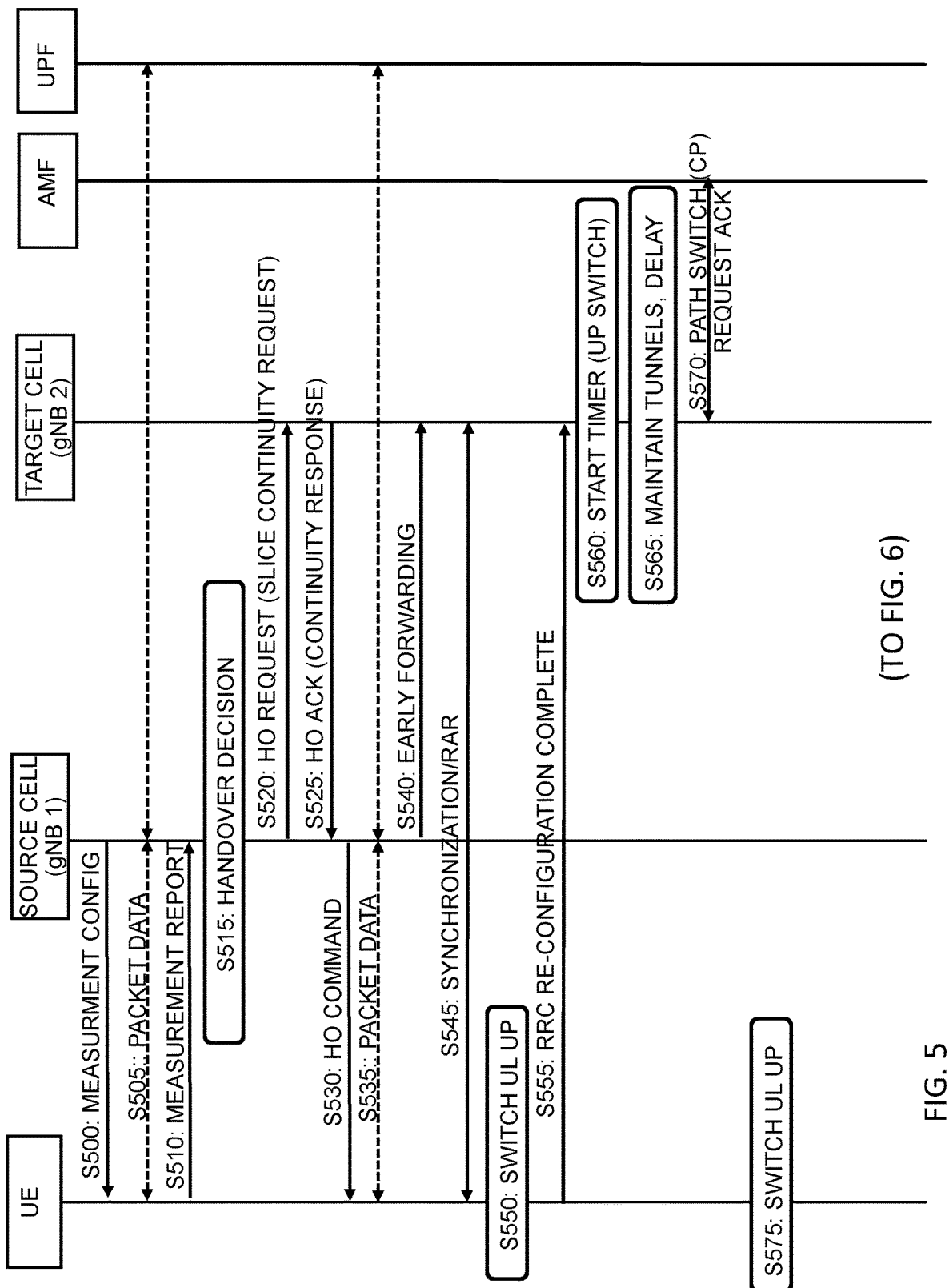
FIG. 5 shows a signaling diagram explaining a communication control according to example of an embodiment in a DAPS handover case.
Figure 6:
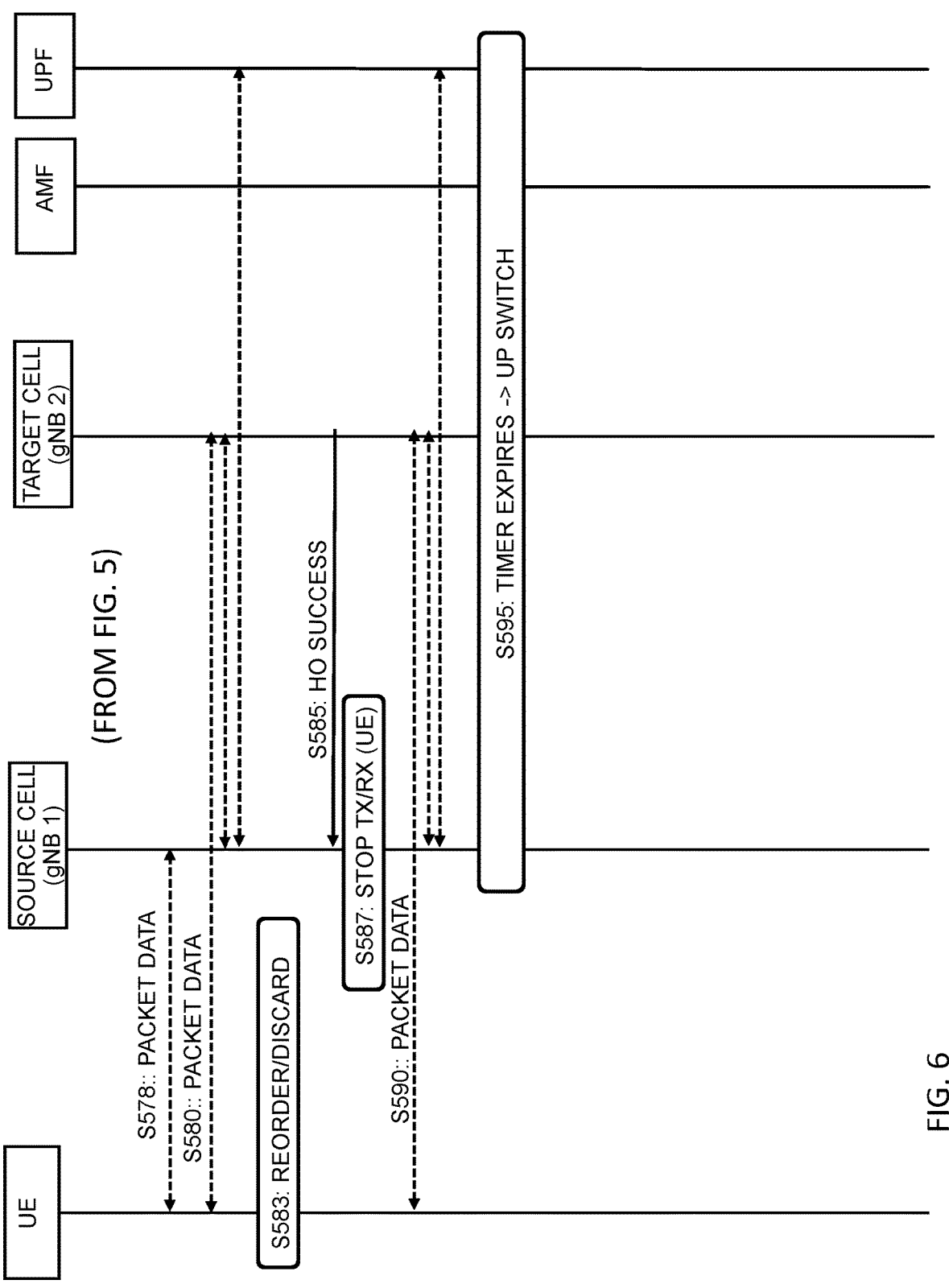
FIG. 6 shows a signaling diagram explaining a communication control according to example of an embodiment in the DAPS handover case.

In case that during the time period indicated by the timer value Td a HO to cell 25 is conducted, as described above, a complete connection switch to gNB3 24 may take place. However, in the present example, it is assumed that the timer expires in S490. Then, as also indicated above, as one of possible options, the target gNB2 22 conducts a complete path switch, i.e. the UP path switch being delayed so far is executed. That is the gNB2 22 takes over the communication with the UE 10. Furthermore, a UE context release message is sent from the gNB2 22 to the gNB1 20, which can then release the UE configuration FIGS. 5 and 6 show signaling diagrams explaining a communication control according to examples of an embodiment in a DAPS handover case. It is assumed that a situation like that shown in FIG. 2 is handled by the communication network wherein a DAPS HO procedure is set for the UE which uses slice A in cell 21 which is not supported by cell 23, for example.

Dual active protocol stack (DAPS) refers to a handover procedure also known as enhanced make-before-break handover. Specifically, DAPS is used for reducing a handover interruption time. This is achieved by maintaining the source cell radio link (including data flow) while establishing the target cell radio link.

In S500, the source cell (i.e. gNB1 20) provides the UE with measurement configuration information related to measurements to be conducted for being able to decide about the necessity to conduct a handover, such as communication quality measurements and the like.

In S505, a normal packet data communication with the communication network is conducted for the UE 10 via gNB1 20 being the current serving node for UE 10.

In S510, a measurement report is provided by the UE 10 to the gNB1 20.

Based on the measurement report, in S515, the gNB1 20 makes a handover decision, wherein cell 23 with gNB2 22 as target node is determined.

In S520, a HO request message is sent to the target gNB2 22. According to the present example, as the UE 10 uses for at least one of the communication sessions established in the communication network slice A and the source gNB1 20 is aware that the cell to which the handover is to be made is not able to provide slice A service, the HO related message in S520 comprises also a request for service continuity. That is, in the message in S520, the gNB1 20 sends slice A specific RAN configuration information, such as a DRB profile, a potential neighbor list, an indication that the source node acts as an UL tunnel endpoint, the above described slice A container, and information indicating a delayed UP path switch, such as a timer value Td or a corresponding instruction to use a preset timer value for this purpose.

In S525, after having decided about the request for service continuity, the target gNB2 22 sends a response message to the source gNB1 20. The response message is included in a HO acknowledgement message and comprises an indication whether the gNB2 22 accepts or rejects the request for service continuity. For example, the decision regarding supporting the service continuity or not can be made on the basis of a current load situation or the like.

In accordance with a granularity of the request for service continuity, or independent thereof, the acceptance/rejection can be indicated per PDU, per QoS flow or per DRB. Furthermore, in indication is included that the gNB2 22 acts as a DL tunnel endpoint.

In S530, the source gNB1 20 issues a HO command to the UE.

In the present example, the handover to be conducted is a DAPS HO. Therefore, it is assumed that in S535 a packet data communication like that in S505 is continued.

In S540, the gNB1 20 sends an early forwarding transfer message to the gNB2 22, which is followed by a data forwarding of data from the UE 10.

In S545, a synchronization signaling is sent from the UE 10 to the target gNB2 22, which responds with a RAR signaling.

In S550, the UE conducts an UL user plane switch at a contention free random access.

In S555, the UE 10 sends a RRC re-configuration complete message to the target gNB2 22.

As soon as the UE 10 is attached to the gNB2 22, the timer using the timer value Td is started in S560 which indicated the time period for which at least the UP path switch with the communication network (i.e. the UPF 32) is to be delayed.

During the time period indicated by the timer value Td, as indicated in S565, UL and DL tunnels are maintained between the gNB1 20 and the gNB2 22, while the UP path switch is delayed.

In S570, in the present example, a CP path switch is conducted (i.e. N2 interface between gNB2 22 and AMF 34), by exchanging a corresponding request-response signaling between the gNB2 22 and the AMF 34.

In S575, the UE conducts an UL user plane switch at a contention based random access.

In S578 (see FIG. 6), the UE 10 sends packet data to the gNB1 20.

Furthermore, in S580, since the UE 10 is also attached to the gNB2 22, and the UP connection to the communication network (i.e. the UPF 32) is still at the gNB1 20, due to the service continuity support, the gNB2 22 forwards UP data received from the UE 10 to the gNB1 20, which forwards the data towards the network (e.g. via N3 interface, as described above). On the other hand, data being sent to the UE from the network is relayed from the gNB1 20 to the gNB2 22, which in turn forwards the data to the UE 10.

In S583, the UE 10 conducts a reordering procedure and discards duplicated packets.

The gNB2 22 sends in S586 a HO success indication to the gNB1 20, which in turn stops transmission and reception processing with the UE 10.

That is, from S590 onwards, as the UE 10 is attached to the gNB2 22, while the UP connection to the communication network (i.e. the UPF 32) is still at the gNB1 20, due to the service continuity support, the gNB2 22 forwards UP data received from the UE 10 to the gNB1 20, which forwards the data towards the network (e.g. via N3 interface, as described above). On the other hand, data being sent to the UE from the network is relayed from the gNB1 20 to the gNB2 22, which in turn forwards the data to the UE 10.

In case that during the time period indicated by the timer value Td a HO to cell 25 is conducted, as described above, a complete connection switch to gNB3 24 may take place. However, in the present example, it is assumed that the timer expires in S595. Then, as also indicated above, as one of possible options, the target gNB2 22 conducts a complete path switch, i.e. the UP path switch being delayed so far is executed. That is the gNB2 22 takes over the communication with the UE 10. Furthermore, a UE context release message is sent from the gNB2 22 to the gNB1 20, which can then release the UE configuration.

Figure 7:
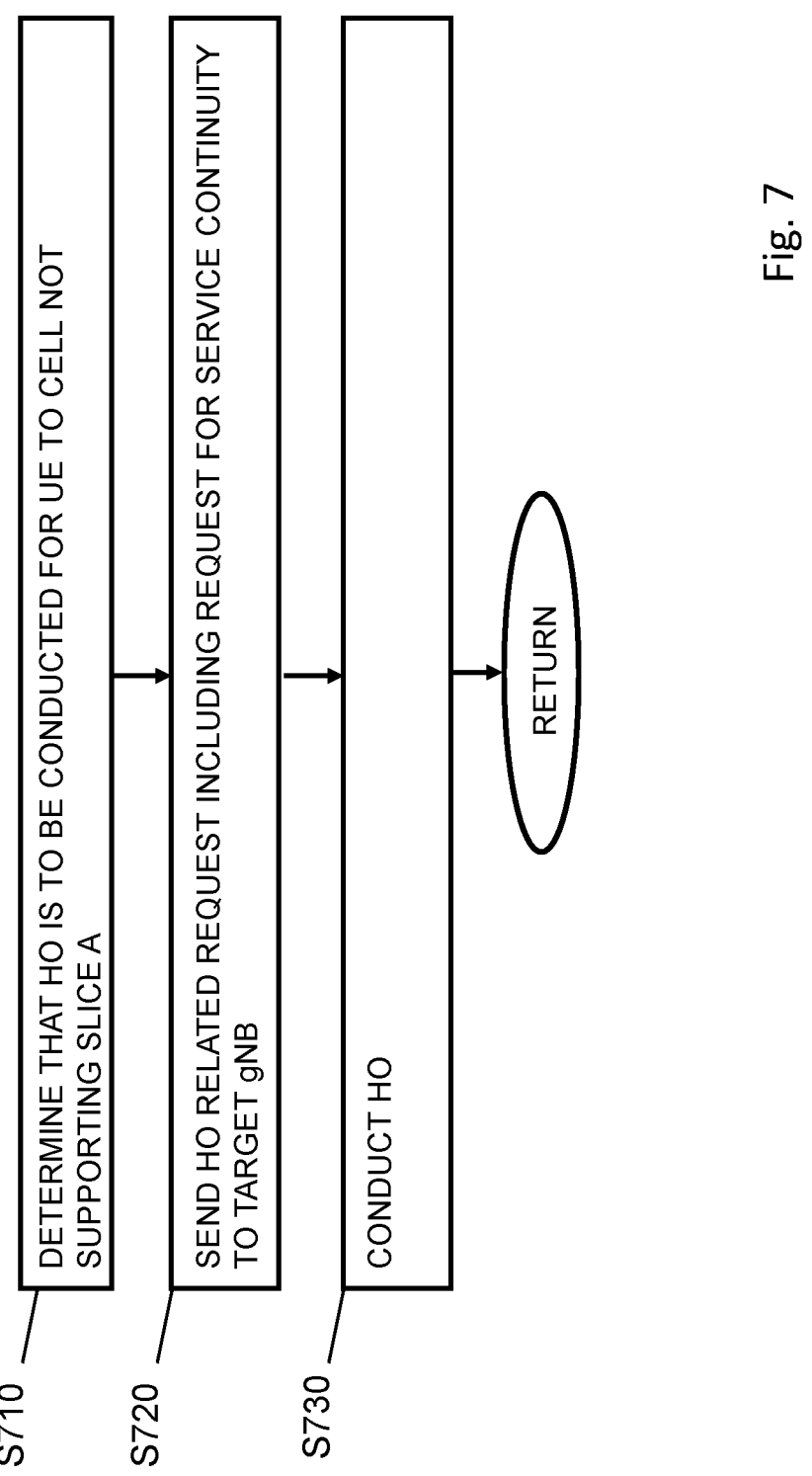
FIG. 7 shows a flow chart of a processing conducted in a communication network control element or function acting as a source node in a handover procedure according to some examples of embodiments.

FIG. 7 shows a flow chart of a processing executed by an communication network control element or function, such as gNB1 20 of FIG. 1 or 2, as described in the examples of FIGS. 3 to 6. That is, FIG. 7 shows a flowchart related to a processing conducted by an communication network control element or function, such as the gNB1 20, which controls a communication connection with at least one communication element or function (i.e. a UE) in a first area of a communication network and using a specific communication capability or communication function in the first area (i.e. slice A). The communication network control element or function conducting the process described in connection with FIG. 7 is configured to act as a source node of a handover procedure to be conducted for the UE, wherein the handover procedure comprises one of a baseline handover procedure, a conditional handover procedure, and a dual active protocol stack handover procedure. As also indicated above, the communication network may be based on a 3GPP standard. However, also other communication standards can be used, according to other examples of embodiments.

In S710, it is determined that a handover procedure is to be conducted for the at least one UE so as to switch the communication connection from the first area (where e.g. slice A is supported) to a second area of the communication network controlled by a target communication network control element or function (e.g. gNB2 22), wherein the second area does not support slice A (i.e. the specific communication capability or communication function used in the first area).

In S720, a handover related request is sent to the target communication network control element or function (gNB2 22) for starting a handover procedure. The handover related request includes a request for service continuity which comprises an indication that service continuity is required for at least one specific communication session using the specific communication capability or communication function (i.e. slice A, for example) in the first area.

By the request for service continuity, it is indicated to the target communication network control element or function that a path switch to the communication network for at least a user plane connection of the at least one specific communication session is to be delayed.

According to some examples of embodiments, the request for service continuity is related, for example, to a packet data unit session, a DRB or a QoS flow of the at least one communication session. That is, the granularity of the request is variable and configurable.

According to some examples of embodiments, the request for service continuity further comprises configuration information indicating a parameter configuration related to a service associated with the at least one specific communication session and the specific communication capability or communication function. The configuration information comprises at least one of selection assistance information for the specific communication capability or communication function (such as S-NSSAI). Moreover, lower layer parameter configuration information (e.g. for PHY, MAC etc.) for the specific communication capability or communication function is included.

According to some examples of embodiments, a timer value indicating a time period during which the path switch for at least the user plane connection of the at least one specific communication session is to be delayed is provided to the target communication network control element or function. The timer value is provided, for example, by including an information element in the request for service continuity which indicated the timer value, or by negotiating the timer value during the handover procedure with the target node.

According to examples of embodiments, the timer value is one of a timer value preconfigured by the communication network (fixed or variable for each neighboring pair of gNBs), a timer value being configured on the basis of trajectory information of the UE for which the handover procedure is to be conducted, or a timer value negotiated with the target communication network control element or function on the basis of a lower layer parameter configuration (MAC, PHY etc.) related to the specific communication capability or communication function to which the service continuity request is related.

According to examples of embodiments, the timer value indicates a minimum time amount for which the target communication network control element or function has to support the service continuity. That is, after expiry of the timer, the target node may or may not be configured to provide resources for packet data transmission.

In S730, the gNB1 20 conducts the HO.

For example, according to examples of embodiments, the gNB1 20 receives, from the target node, a response to the handover related request, i.e. whether the service continuity is supported or not. That is, when the response is checked or processed so as to determine whether the target communication network control element or function supports the service continuity, and in case the service continuity is supported, a communication tunnel to the target communication network control element or function is established for transmitting and receiving user plane data of the communication element or function, i.e. in both UL and DL direction.

According to examples of embodiments, when the handover of the communication element or function to the target communication network control element or function is completed, a transmission control processing via the communication tunnel is conducted for achieving the service continuity. In detail, according to examples of embodiments, user plane data of the UE are received from the target communication network control element or function (i.e. gNB2 22), and then forwarded to a core network element or function of the communication network (e.g. the UPF). On the other hand, user plane data of the UE are received from a core network element or function of the communication network, and forwarded to the target communication network control element or function (i.e. gNB2 22).

According to examples of embodiments, the transmission control processing is conducted until the timer expires, or until an indication to end the transmission control processing is received from the target node (gNB2 22).

Figure 8:
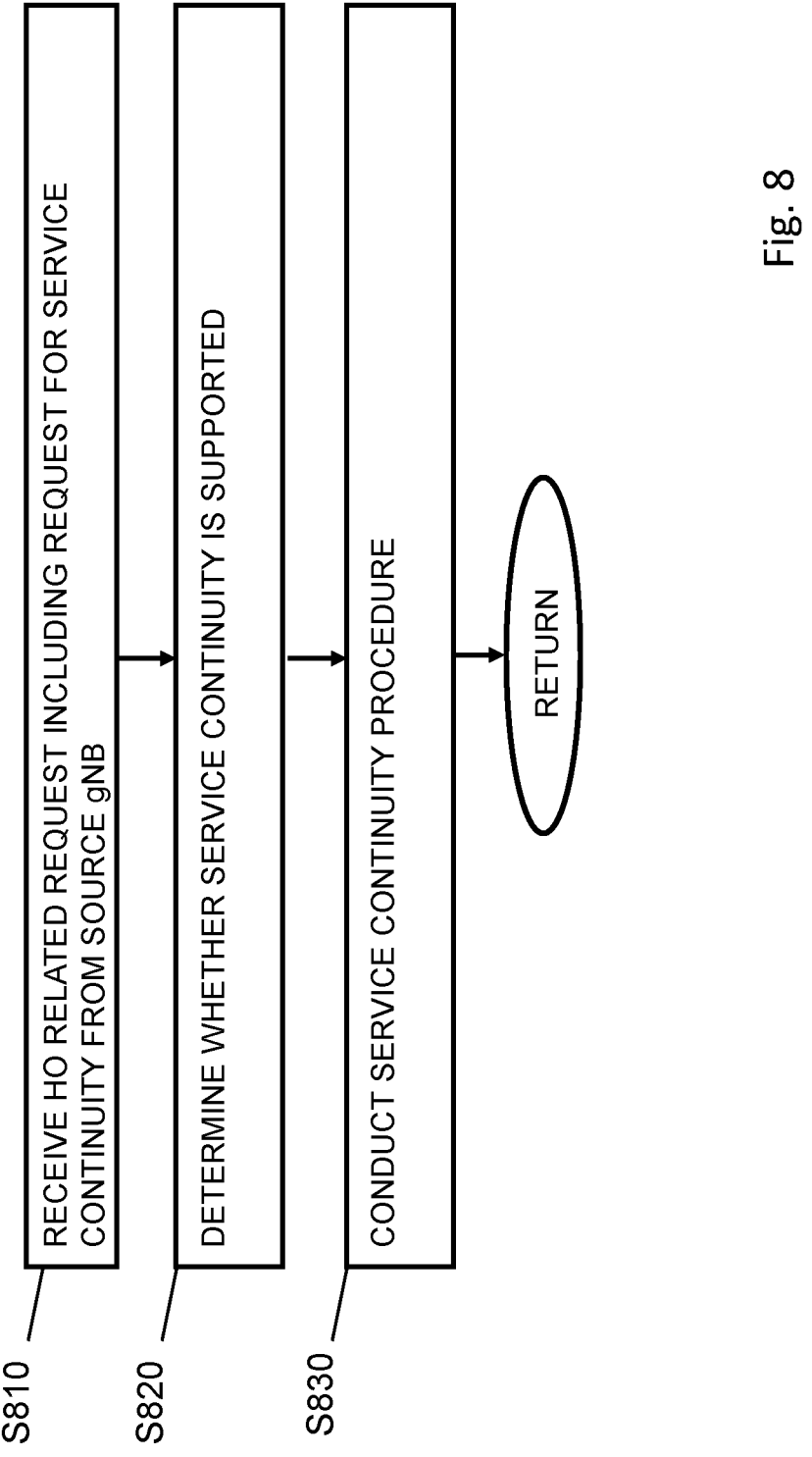
FIG. 8 shows a flow chart of a processing conducted in a communication network control element or function acting as a target node in a handover procedure according to some examples of embodiments.

FIG. 8 shows a flow chart of a processing executed by an communication network control element or function, such as gNB2 22 of FIG. 1 or 2, as described in the examples of FIGS. 3 to 6. That is, FIG. 8 shows a flowchart related to a processing conducted by an communication network control element or function, such as the gNB2 22, which controls a communication connection with at least one communication element or function (i.e. a UE) in a second area of a communication network, wherein the communication network comprising at least the second area and a first area using a specific communication capability or communication function (i.e. slice A) which is not supported in the second area. The communication network control element or function conducting the process described in connection with FIG. 8 is configured to act as a target node of a handover procedure to be conducted for the UE, wherein the handover procedure comprises one of a baseline handover procedure, a conditional handover procedure, and a dual active protocol stack handover procedure. As also indicated above, the communication network may be based on a 3GPP standard. However, also other communication standards can be used, according to other examples of embodiments.

In S810 to receive, from a source communication network control element or function of the first area, a handover related request for starting a handover procedure of the communication element or function. The handover related request includes a request for service continuity which comprises an indication that service continuity is required for at least one specific communication session using the specific communication capability or communication function (i.e. slice A, for example) in the first area.

According to some examples of embodiments, the request for service continuity is related, for example, to a packet data unit session, a DRB or a QoS flow of the at least one communication session. That is, the granularity of the request is variable and configurable.

According to some examples of embodiments, the request for service continuity further comprises configuration information indicating a parameter configuration related to a service associated with the at least one specific communication session and the specific communication capability or communication function. The configuration information comprises at least one of selection assistance information for the specific communication capability or communication function (such as S-NSSAI). Moreover, lower layer parameter configuration information (e.g. for PHY, MAC etc.) for the specific communication capability or communication function is included.

In S820, it is determined whether the requested service continuity is supported. This is based, for example, on a load situation, a network operator setting, or the like.

In case the determination in S820 is affirmative, in S830, service continuity procedure is conducted in which a path switch to the communication network for at least a user plane connection of the at least one specific communication session is delayed.

According to some examples of embodiments, the target gNB2 22 obtains a timer value indicating a time period during which the path switch for at least the user plane connection of the at least one specific communication session is to be delayed. The timer value is obtained, for example, by means of a configuration information preset by the communication network, an information element included in the request for service continuity (i.e. provided by the source node), or a negotiation with the source node (i.e. gNB1 20) during the handover procedure.

According to some examples of embodiments, the timer value is one of a timer value preconfigured by the communication network, a timer value being configured on the basis of trajectory information of the UE for which the handover procedure is to be conducted, or a timer value negotiated with the source node on the basis of a lower layer (PHY, MAC etc.) parameter configuration related to the specific communication capability or communication function (i.e. slice A) to which the service continuity request is related.

Moreover, according to examples of embodiments, the timer value indicates a minimum time amount for which the target node (i.e. gNB2 22) has to support the service continuity. That is, after expiry of the timer, depending on a configuration, the gNB2 22 may or may not provide resources for packet data transmission.

According to examples of embodiments, a timer using the obtained timer value is started when a random access of the UE is completed, or an acknowledgement of an execution of the handover is received from the UE.

In case the service continuity is supported, according to examples of embodiments, there is also conducted a process in which a communication tunnel to the source node (i.e. gNB1 20) is established which is used for transmitting and receiving (i.e. UL and DL) of user plane data of the UE.

According to examples of embodiments, when the handover of the UE to the gNB2 22 is completed, a communication control processing via the communication tunnel is conducted. The communication control processing includes that user plane data are received from the UE and forwarded to the source node (i.e. gNB1 20), while user plane data for the UE being received from the source node (i.e. gNB1 20) are forwarded to the UE.

According to examples of embodiments, the communication control processing is conducted until the timer expires, or until a connection switch (i.e. handover) to another cell is executed (i.e. handover to cell 25, for example).

Furthermore, according to examples of embodiments, a path switch to the communication network for a control plane connection of the at least one specific communication session is conducted while the path switch to the communication network for at least the user plane connection of the at least one specific communication session is delayed (according to the timer value, for example).

According to examples of embodiments, it is checked whether a further handover procedure for the communication element or function to an area (e.g. cell 25) using the specific communication capability or communication function (i.e. slice A) is to be executed during the support of the service continuity (i.e. during timer Td).

If the further handover procedure is to be executed, the handover of the communication connection of the UE to a further target node (e.g. gNB3 24) of the area using the specific communication capability or communication function is initiated.

On the other hand, if the further handover procedure is not to be executed, the support of the service continuity is continued, or alternatively the support of the service continuity is ended and the at least one specific communication session of the communication element or function using the specific communication capability or communication function is terminated (i.e., at least the session using slice A is stopped, while other sessions being in accordance with communication capabilities of the gNB2 22 can be continued (i.e. UP switch is done)).

According to examples of embodiments, the determination that the area to which the handover is to be executed uses the specific communication capability or communication function (i.e. slice A) is done on the basis of the configuration information indicating the parameter configuration received in the request for service continuity.

Figure 9:
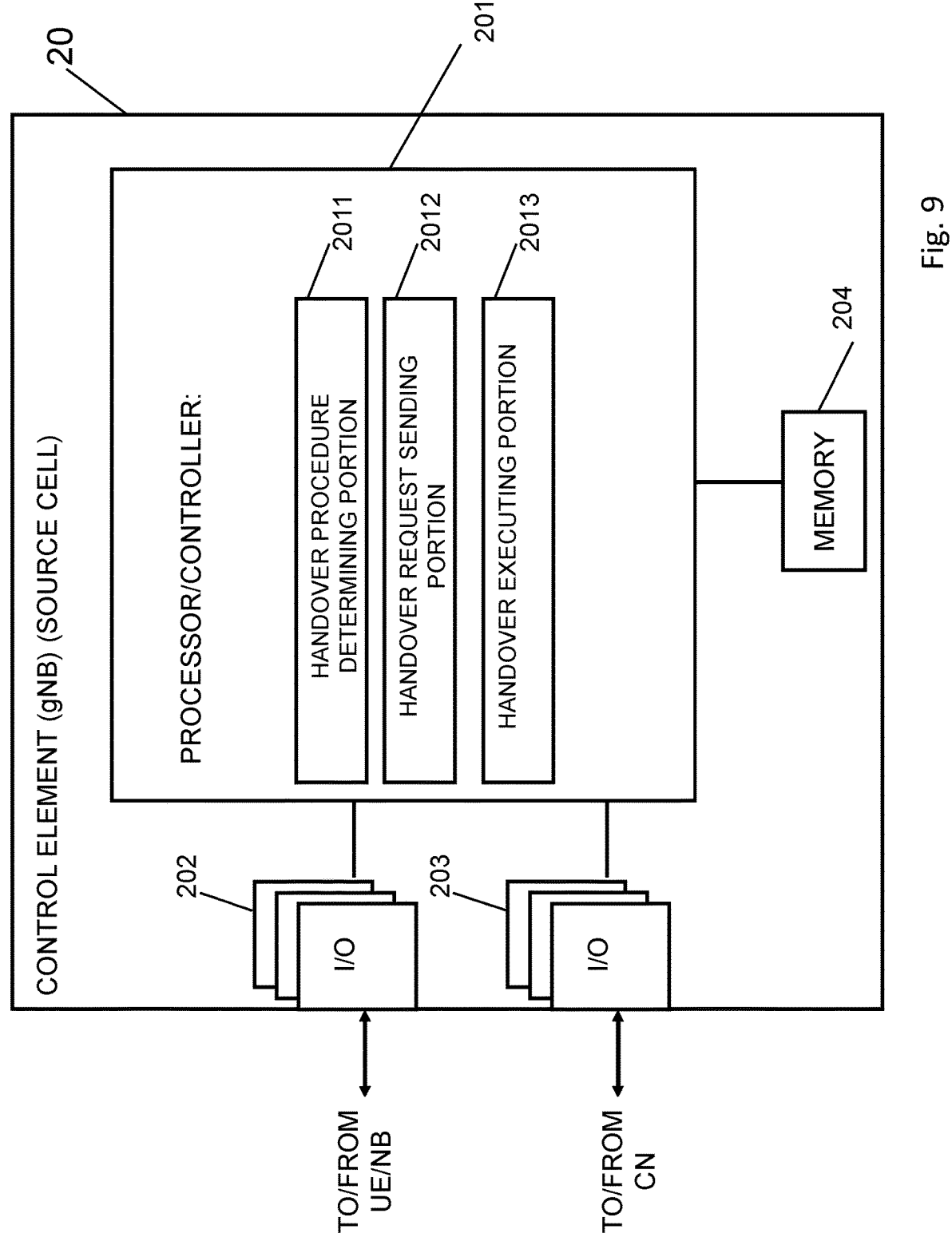
FIG. 9 shows a diagram of a network element or function representing a communication network control element or function acting as a source node in a handover procedure according to some examples of embodiments.

FIG. 9 shows a diagram of a communication network control element or function, such as gNB1 20, according to some examples of embodiments, as described in connection with FIGS. 3 to 6, which is configured to conduct, as a source node, a procedure for controlling and conducting a handover in a communication network according to examples of embodiments of the disclosure. It is to be noted that the network element or function, like the gNB, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function 20 shown in FIG. 9 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element such as a UE, other access network nodes, such as other gNBs, e.g. by means of an Xn interface, and the like. The I/O units 203 may be used for communicating with the communication network, such as CN elements or functions. The I/O units 202 and 203 may be combined units including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described control processing. In particular, the processor or processing circuitry or function 201 includes one or more of the following sub-portions. Sub-portion 2011 is a processing portion which is usable as a portion for determining a handover procedure. The portion 2011 may be configured to perform processing according to S710 of FIG. 7. Furthermore, the processor or processing circuitry or function 201 may include a sub-portion 2012 usable as a portion for sending a handover related request. The portion 2012 may be configured to perform a processing according to S720 of FIG. 7. In addition, the processor or processing circuitry or function 201 may include a sub-portion 2013 usable as a portion for executing a handover procedure. The portion 2013 may be configured to perform a processing according to S730 of FIG. 7.

Figure 10:
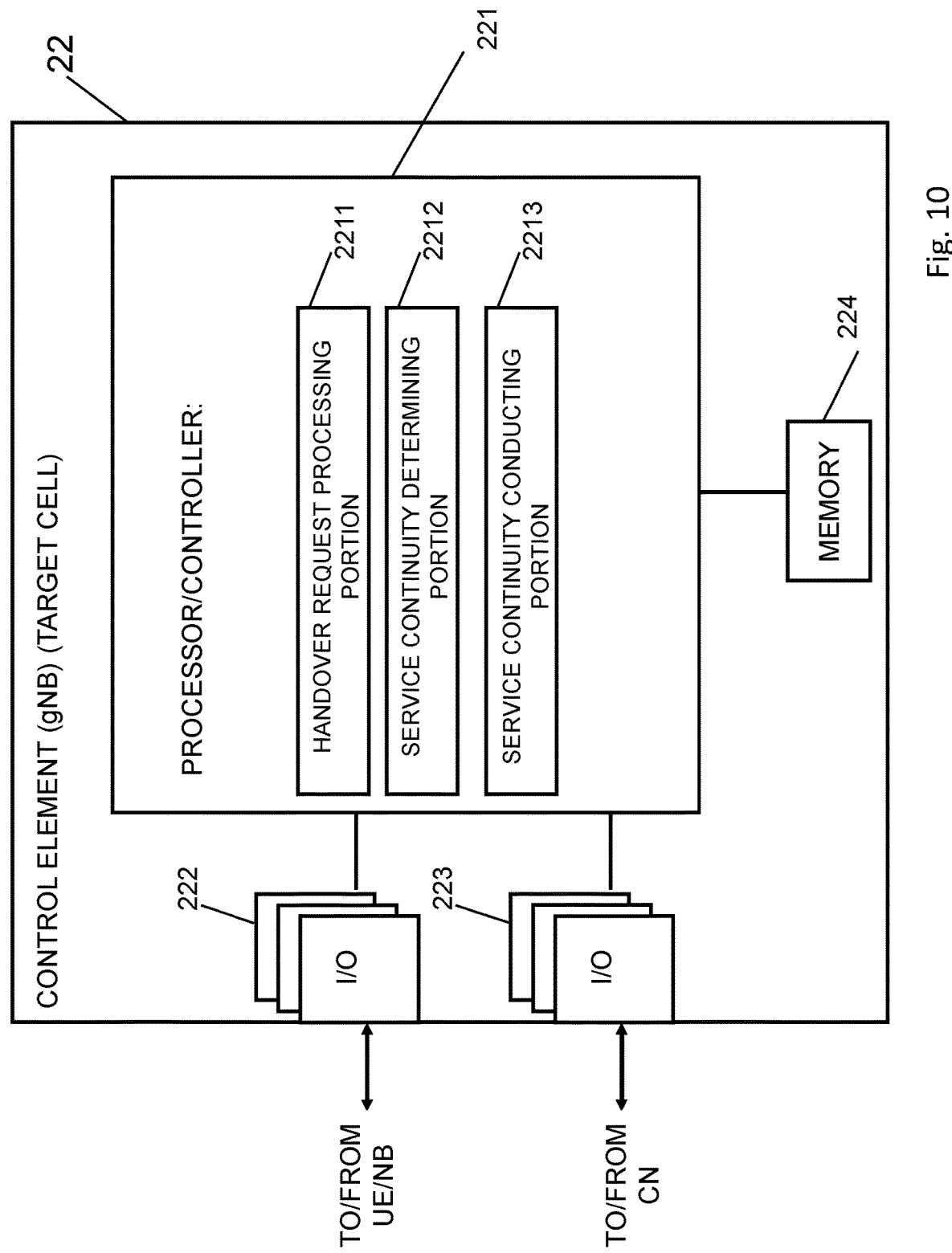
FIG. 10 shows a diagram of a network element or function representing a communication network control element or function acting as a target node in a handover procedure according to some examples of embodiments.

FIG. 10 shows a diagram of a communication network control element or function, such as gNB2 22, according to some examples of embodiments, as described in connection with FIGS. 3 to 6, which is configured to conduct, as a target node, a procedure for controlling and conducting a handover in a communication network according to examples of embodiments of the disclosure. It is to be noted that the network element or function, like the gNB, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function 22 shown in FIG. 10 may include a processing circuitry, a processing function, a control unit or a processor 221, such as a CPU or the like, which is suitable for executing instructions given by programs or the like related to the control procedure. The processor 221 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 222 and 223 denote input/output (I/O) units or functions (interfaces) connected to the processor or processing function 221. The I/O units 222 may be used for communicating with a communication element such as a UE, other access network nodes, such as other gNBs, e.g. by means of an Xn interface, and the like. The I/O units 223 may be used for communicating with the communication network, such as CN elements or functions. The I/O units 222 and 223 may be combined units including communication equipment towards several entities, or may include a distributed structure with a plurality of different interfaces for different entities. Reference sign 224 denotes a memory usable, for example, for storing data and programs to be executed by the processor or processing function 221 and/or as a working storage of the processor or processing function 221. It is to be noted that the memory 224 may be implemented by using one or more memory portions of the same or different type of memory.

The processor or processing function 221 is configured to execute processing related to the above described control processing. In particular, the processor or processing circuitry or function 221 includes one or more of the following sub-portions. Sub-portion 2211 is a processing portion which is usable as a portion for processing a handover request. The portion 2211 may be configured to perform processing according to S810 of FIG. 8. Furthermore, the processor or processing circuitry or function 221 may include a sub-portion 2212 usable as a portion for determining whether service continuity can be supported. The portion 2212 may be configured to perform a processing according to S820 of FIG. 8. In addition, the processor or processing circuitry or function 221 may include a sub-portion 2213 usable as a portion for conducting a service continuity procedure. The portion 2213 may be configured to perform a processing according to S830 of FIG. 8.

It is to be noted that even though in the above described examples of embodiments functions conducted by a source node in the handover procedure according to examples of embodiments (i.e. functions conducted by gNB1 20) and functions conducted by a target node in the handover procedure according to examples of embodiments (i.e. functions conducted by gNB2 22) are described to be part of respective separate elements or functions, it is of course also possible that one or more of the communication network control elements or functions deployed in the communication network as described, for example, in connection with FIG. 1 or 2 is/are configured to have both functionalities of source and target node. That is, the processes described in connection with FIGS. 7 and 8 and/or the elements/functions described in connection with FIGS. 9 and 10 can be combined in one element or function acting as a communication network control element or function in the communication network.

As described above, by means of the measures discussed in the examples of embodiments, it is possible to avoid service interruption when a communication element or function, such as a UE, moves slightly and typically temporarily outside of a slice coverage in non-homogenous slice support deployments. That is, a mechanism is defined which allows to ensure service continuity in non-homogenous slice support scenarios.

Furthermore, according to examples of embodiments of the invention, the UE is kept in a connected mode for a smoother network-controlled return to a slice supporting cell. This is in particular useful for early deployments of network slices that need to be supported in limited coverage areas. In such deployments, the actual UE behaviors like mobility would only be accurately visible after the actual deployments. Therefore, to overcome any discrepancies in the initial planning and to avoid un-necessary service interruptions, the mechanism according to examples of embodiments allows service continuity even when the UE moves slightly and typically temporarily outside of the cells currently supporting the required slice.

Furthermore, examples of embodiments of the invention are also applicable to a scenarios where the target node (e.g. gNB2 22) is not connected to the same UPF as the source gNB, since the UPFs are typically implemented per slice and the target gNB is not supporting the same slice. With the control plane path switch, it is ensured that during the service continuity over Xn (which may last for some time), the target cell can still receive control plane messages from the AMF.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

According to a further example of embodiments, there is provided, for example, an apparatus for use by a communication network control element or function configured to control a communication connection with at least one communication element or function in a first area of a communication network and using a specific communication capability or communication function in the first area, the apparatus comprising means configured to determine that a handover procedure is to be conducted for the at least one communication element or function so as to switch the communication connection from the first area to a second area of the communication network controlled by a target communication network control element or function, wherein the second area does not support specific communication capability or communication function used in the first area, means configured to cause sending of a handover related request to the target communication network control element or function for starting a handover procedure, the handover related request including a request for service continuity comprising an indication that service continuity is required for at least one specific communication session using the specific communication capability or communication function in the first area, wherein the request for service continuity indicates to the target communication network control element or function that a path switch to the communication network for at least a user plane connection of the at least one specific communication session is to be delayed.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, an apparatus for use by a communication network control element or function configured to control a communication connection with at least one communication element or function in a second area of a communication network, the communication network comprising at least the second area and a first area using a specific communication capability or communication function which is not supported in the second area, the apparatus comprising means configured to receive, from a source communication network control element or function of the first area, a handover related request for starting a handover procedure of the communication element or function, the handover related request including a request for service continuity comprising an indication that service continuity is required for at least one specific communication session using the specific communication capability or communication function of the first area, means configured to determine whether the requested service continuity is supported, and in case the determination is affirmative means configured to conduct a service continuity procedure in which a path switch to the communication network for at least a user plane connection of the at least one specific communication session is delayed.

Furthermore, according to some other examples of embodiments, the above defined apparatus may further comprise means for conducting at least one of the processing defined in the above described methods, for example a method according to that described in connection with FIG. 8.

According to a further example of embodiments, there is provided, for example, a non-transitory computer readable medium comprising program instructions for causing an apparatus to perform, when controlling a communication connection with at least one communication element or function in a first area of a communication network and using a specific communication capability or communication function in the first area, determining that a handover procedure is to be conducted for the at least one communication element or function so as to switch the communication connection from the first area to a second area of the communication network controlled by a target communication network control element or function, wherein the second area does not support specific communication capability or communication function used in the first area, causing sending of a handover related request to the target communication network control element or function for starting a handover procedure, the handover related request including a request for service continuity comprising an indication that service continuity is required for at least one specific communication session using the specific communication capability or communication function in the first area, wherein the request for service continuity indicates to the target communication network control element or function that a path switch to the communication network for at least a user plane connection of the at least one specific communication session is to be delayed.

According to a further example of embodiments, there is provided, for example, a non-transitory computer readable medium comprising program instructions for causing an apparatus to perform, when controlling a communication connection with at least one communication element or function in a second area of a communication network, the communication network comprising at least the second area and a first area using a specific communication capability or communication function which is not supported in the second area, receiving, from a source communication network control element or function of the first area, a handover related request for starting a handover procedure of the communication element or function, the handover related request including a request for service continuity comprising an indication that service continuity is required for at least one specific communication session using the specific communication capability or communication function of the first area, determining whether the requested service continuity is supported, and in case the determination is affirmative conducting a service continuity procedure in which a path switch to the communication network for at least a user plane connection of the at least one specific communication session is delayed.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use with a communication network control element or function configured to control a communication connection with at least one communication element or function in a first area of a communication network and using a specific communication capability or communication function in the first area, the apparatus comprising:

at least one processor; and at least one non-transitory memory storing instructions that, when executed with the at least one processor, cause the apparatus at least to:

determine that a handover procedure is to be conducted for the at least one communication element or function so as to switch the communication connection from the first area to a second area of the communication network controlled with a target communication network control element or function, wherein the second area does not support specific communication capability or communication function used in the first area; and cause sending of a handover related request to the target communication network control element or function for starting a handover procedure, the handover related request including a request for service continuity comprising an indication that service continuity is required for at least one specific communication session using the specific communication capability or communication function in the first area;

wherein the request for service continuity indicates to the target communication network control element or function that a path switch to the communication network for at least a user plane connection of the at least one specific communication session is to be delayed.

2. The apparatus according to claim 1, wherein the request for service continuity is related to a packet data unit session, a data radio bearer, or a quality of service flow of the at least one communication session.

3. The apparatus according to claim 1, wherein the request for service continuity further comprises configuration information indicating a parameter configuration related to a service associated with the at least one specific communication session and the specific communication capability or communication function, wherein the configuration information comprises at least one of:

selection assistance information for the specific communication capability or communication function; or lower layer parameter configuration information for the specific communication capability or communication function.

4. The apparatus according to claim 1, wherein the instructions, when executed with the at least one processor, cause the apparatus at least to:

provide, to the target communication network control element or function, a timer value indicating a time period during which the path switch for at least the user plane connection of the at least one specific communication session is to be delayed, wherein the timer value is provided with including an information element in the request for service continuity, or negotiating the timer value during the handover procedure.

5. The apparatus according to claim 4, wherein the timer value is one of a timer value preconfigured with the communication network, a timer value being configured on the basis of trajectory information of the communication element or function for which the handover procedure is to be conducted, or a timer value negotiated with the target communication network control element or function on the basis of a lower layer parameter configuration related to the specific communication capability or communication function to which the service continuity request is related.

6. The apparatus according to claim 4, wherein the timer value indicates a minimum time amount for which the target communication network control element or function has to support the service continuity.

7. The apparatus according to claim 1, wherein the instructions, when executed with the at least one processor, cause the apparatus at least to:

receive, from the target communication network control element or function, a response to the handover related request, process the response for determining whether the target communication network control element or function supports the service continuity, and in case the service continuity is supported, establish a communication tunnel to the target communication network control element or function for transmitting and receiving user plane data of the communication element or function.

8. The apparatus according to claim 7, wherein the instructions, when executed with the at least one processor, cause the apparatus at least to:

when the handover of the communication element or function to the target communication network control element or function is completed, conduct a transmission control processing with the communication tunnel including receiving, from the target communication network control element or function, user plane data of the communication element or function and forwarding the received user plane data to a core network element or function of the communication network, and receiving, from a core network element or function of the communication network, user plane data of the communication element or function and forwarding the received user plane data to the target communication network control element or function.

9. The apparatus according to claim 8, wherein the instructions, when executed with the at least one processor, cause the apparatus at least to:

conduct the transmission control processing until
the timer expires, or
an indication to end the transmission control processing is received from the target communication network control element or function.

10. The apparatus according to claim 1, wherein the handover procedure comprises one of a baseline handover procedure, a conditional handover procedure, or a dual active protocol stack handover procedure.

11. An apparatus for use with a communication network control element or function configured to control a communication connection with at least one communication element or function in a second area of a communication network, the communication network comprising at least the second area and a first area using a specific communication capability or communication function which is not supported in the second area, the apparatus comprising:

at least one processor; and at least one non-transitory memory storing instructions that, when executed with the at least one processor, cause the apparatus at least to:

receive, from a source communication network control element or function of the first area, a handover related request for starting a handover procedure of the communication element or function, the handover related request including a request for service continuity comprising an indication that service continuity is required for at least one specific communication session using the specific communication capability or communication function of the first area;

determine whether the requested service continuity is supported; and in case the determination is affirmative, conduct a service continuity procedure in which a path switch to the communication network for at least a user plane connection of the at least one specific communication session is delayed.

12. The apparatus according to claim 11, wherein the request for service continuity is related to a packet data unit session, a data radio bearer, or a quality of service flow of the at least one communication session.

13. The apparatus according to claim 11, wherein the request for service continuity further comprises configuration information indicating a parameter configuration related to a service associated with the at least one specific communication session and the specific communication capability or communication function, wherein the configuration information comprises at least one of selection assistance information for the specific communication capability or communication function, or lower layer parameter configuration information for the specific communication capability or communication function.

14. The apparatus according to claim 11, wherein the instructions, when executed with the at least one processor, cause the apparatus at least to:

obtain a timer value indicating a time period during which the path switch for at least the user plane connection of the at least one specific communication session is to be delayed, wherein the timer value is obtained with a configuration information preset with the communication network, an information element included in the request for service continuity, or a negotiation with the source communication network control element or function during the handover procedure.

15. The apparatus according to claim 14, wherein the timer value is one of a timer value preconfigured with the communication network, a timer value being configured on the basis of trajectory information of the communication element or function for which the handover procedure is to be conducted, or a timer value negotiated with the source communication network control element or function on the basis of a lower layer parameter configuration related to the specific communication capability or communication function to which the service continuity request is related.

16. The apparatus according to claim 14, wherein the timer value indicates a minimum time amount for which the service continuity is to be supported.

17. The apparatus according to claim 14, wherein the instructions, when executed with the at least one processor, cause the apparatus at least to:

start a timer using the obtained timer value when a random access of the communication element or function is completed, or an acknowledgement of an execution of the handover is received from the communication element or function.

18. The apparatus according to claim 11, wherein the instructions, when executed with the at least one processor, cause the apparatus at least to:

in case the service continuity is supported, establish a communication tunnel to the source communication network control element or function for transmitting and receiving user plane data of the communication element or function.

19. The apparatus according to claim 18, wherein the instructions, when executed with the at least one processor, cause the apparatus at least to:

when the handover of the communication element or function to the target communication network control element or function is completed, conduct a communication control processing with the communication tunnel including receiving, from the communication element or function, user plane data and forwarding the received user plane data to the source communication network control element or function, and receiving, from the source communication network control element or function, user plane data for the communication element or function and forwarding the received user plane data to the communication element or function.

20. The apparatus according to claim 19, wherein the instructions, when executed with the at least one processor, cause the apparatus at least to:

conduct the communication control processing until the timer expires, or a handover procedure to another cell is executed.

\* \* \* \* \*